US011099295B2

(12) United States Patent
Lindmark et al.

(10) Patent No.: US 11,099,295 B2
(45) Date of Patent: Aug. 24, 2021

(54) PHOTOELECTRIC SENSOR WITH APERTURE-CONTROLLED FIELD-OF-VIEW

(71) Applicant: Banner Engineering Corp., Plymouth, MN (US)

(72) Inventors: Eric K. Lindmark, Shoreview, MN (US); Dennis R. Luer, Maple Grove, MN (US)

(73) Assignee: BANNER ENGINEERING CORP., Plymouth, MN (US)

( * ) Notice: Subject to any disclaimer, the term of this patent is extended or adjusted under 35 U.S.C. 154(b) by 188 days.

(21) Appl. No.: 16/354,900

(22) Filed: Mar. 15, 2019

(65) Prior Publication Data

US 2019/0285769 A1  Sep. 19, 2019

Related U.S. Application Data

(60) Provisional application No. 62/644,333, filed on Mar. 16, 2018.

(51) Int. Cl.
*G01V 8/14* (2006.01)

(52) U.S. Cl.
CPC .................................. *G01V 8/14* (2013.01)

(58) Field of Classification Search
CPC ... G01V 8/14; G01V 8/12; G01V 8/10; G01S 17/00; G01S 17/06; G01S 17/04; G01J 1/04; G01J 1/0437; G01J 1/044; G01J 1/0466; G01J 1/06; G01J 2001/061; G01J 2001/066; G01J 2001/063
See application file for complete search history.

(56) References Cited

U.S. PATENT DOCUMENTS

| 4,306,147 | A | * | 12/1981 | Fukuyama | G01S 17/04 250/221 |
| 4,649,270 | A | * | 3/1987 | Goldenberg | G01V 8/14 250/221 |
| 5,452,388 | A | * | 9/1995 | Rittle | G02B 6/3849 385/89 |
| 6,271,523 | B1 | * | 8/2001 | Weaver | G01D 5/40 250/341.8 |
| 2003/0123045 | A1 | * | 7/2003 | Riegl | G01S 7/4817 356/4.01 |
| 2010/0256450 | A1 | * | 10/2010 | Choi | A61B 1/00195 600/182 |

* cited by examiner

*Primary Examiner* — Jennifer D Bennett
(74) *Attorney, Agent, or Firm* — Craige Thompson; Thompson Patent Law; Timothy D. Snowden

(57) ABSTRACT

Apparatus and associated methods relate to a photoelectric sensor system having a transmitter and a receiver, and at least one aperture module configured to modify a nominal field of view (FOV) of the transmitter and/or receiver, such that an overlap between the transmitter and receiver FOVs is controlled. In an illustrative example, the aperture module may be a plate having respective receiver and transmitter apertures. The transmitter and/or receiver apertures may be aligned or slightly offset from respective transmitter and receiver optical axes. The transmitter and/or receiver apertures may have a specific size/shape/position that produces a custom predetermined FOV overlap. At least one registration/alignment pin may extend through the aperture plate, a baffle, and a lens module to control orientation. The photoelectric sensor system may advantageously (1) be more resistant to the "white card effect," (2) increase maximum sensor range, and (3) control the shape/size/overlap of the FOVs.

20 Claims, 17 Drawing Sheets

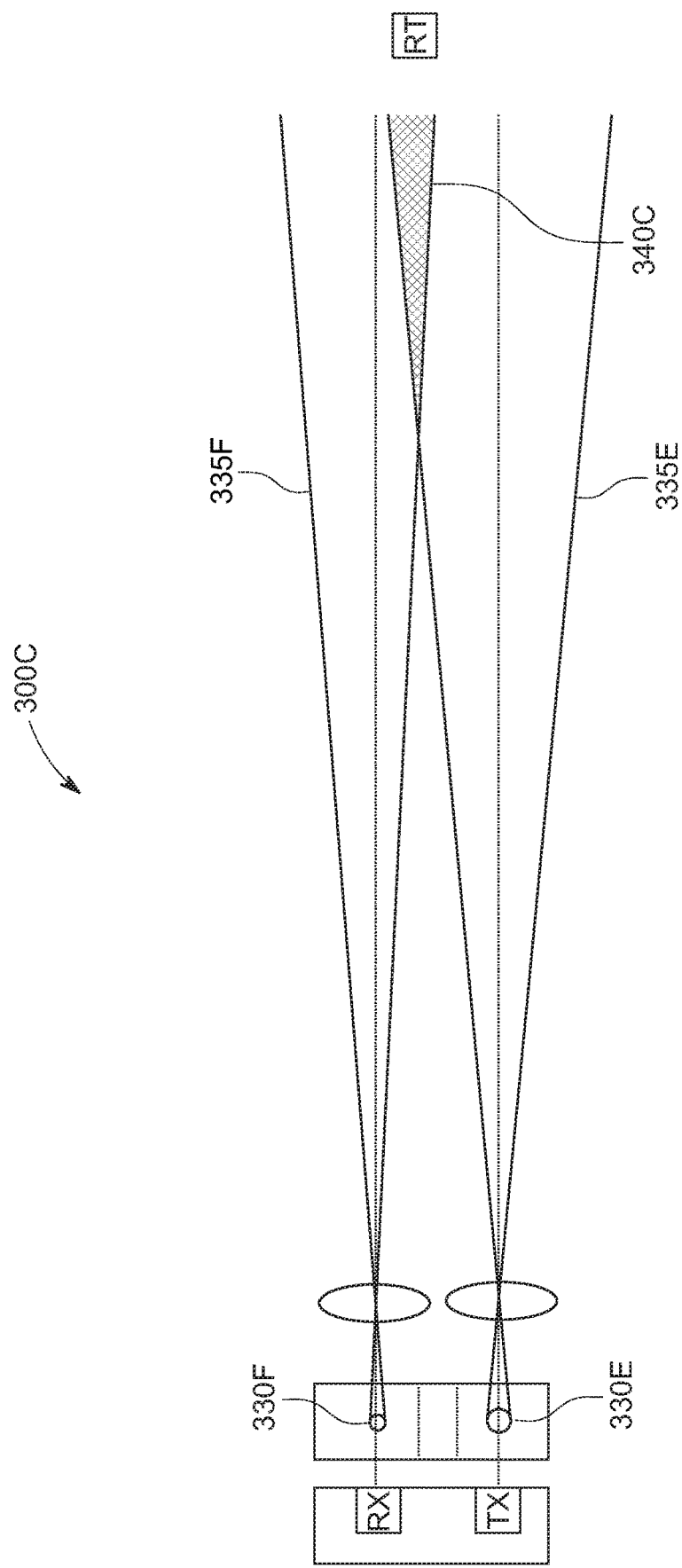

PHOTOELECTRIC SENSOR WITH APERTURE-CONTROLLED FIELD-OF-VIEW

CROSS-REFERENCE TO RELATED APPLICATIONS

This application claims the benefit of U.S. Provisional Application Ser. No. 62/644,333, titled "Photoelectric Sensor with Aperture-Controlled Field-of-View," filed by Eric Lindmark, et al., on Mar. 16, 2018. This application incorporates the entire contents of the foregoing application(s) herein by reference.

This application also incorporates the entire contents of commonly assigned U.S. Pat. No. 6,946,643, titled "Retro-Reflective Photoelectric Sensor," filed by Robert Fayfield, on Jan. 17, 2003, herein by reference.

This application has common inventorship and common ownership with U.S. patent application Ser. No. 15/472,068, titled "Retro-Reflective Sensor with Multiple Detectors," filed by Eric Lindmark, et al., on Mar. 28, 2017, the entire contents of which are herein incorporated by reference.

TECHNICAL FIELD

Various embodiments relate generally to photoelectric sensors.

BACKGROUND

A photoelectric sensor, or photo eye, is a device used to discover the distance, absence, or presence of an object by using a light transmitter and a photoelectric receiver. Photoelectric sensors may be used in an industrial manufacturing setting. There may be three different types of photoelectric sensors: opposed (through beam), retro-reflective, and proximity-sensing (diffuse).

A retroreflector is a device or surface that reflects light back to its source with a minimum of scattering. In a retroreflector, an electromagnetic wave-front is reflected back along a vector that is parallel to, but opposite in direction from, the wave's source. The angle of incidence at which the device or surface reflects light in this way is greater than zero, unlike a planar mirror, which does this only if the mirror is exactly perpendicular to the wave front, having a zero angle of incidence.

An aperture is a hole or an opening through which light travels. The aperture and focal length of an optical system may determine the cone angle of a bundle of rays that are emitted or are accepted by an optical system. An aperture located near the focal plane of the optical system may determine how collimated the emitted or accepted rays are. For example, if an aperture is narrow, then highly collimated rays are emitted or accepted by the optical system. A system with a wider aperture emits or accepts less collimated rays, resulting in a larger field of view for the system.

The effective range of a retro-reflective system is limited in part by reflections of the emitted light beams from an object that obstructs the field of view between the emitter and the retro-reflector such as other reflective materials which can also reflect sufficient light beams capable of striking the photoelectric sensor and incorrectly determine that no obstruction is present, when in fact an obstruction is present. For example, white labels on boxes or reflective clothing worn by individuals crossing through the field of view can create a false "unbroken beam" event. In an illustrative example, retro-reflective systems may be calibrated by introducing a "white card" test sample into the beam, as an obstruction at close proximity to the emitter. If the photoelectric sensor is struck by sufficient scattered light beams to incorrectly determine no obstruction is present, the minimum sensor threshold of the receiver must be increased. Doing so will not only reduce the chance of incorrectly determining no object is present but will also decrease the total detection effective range with which the retro-reflector may be positioned from the emitter to obtain a reliable signal intensity to strike the photoelectric sensor, under normal operating conditions. Further discussion of "white cards" can be found, for example, in U.S. patent application Ser. No. 15/472,068, titled "Retro-Reflective Sensor with Multiple Detectors," filed by Eric Lindmark, et al., on Mar. 28, 2017, the entire contents of which are herein incorporated by reference.

SUMMARY

Apparatus and associated methods relate to a photoelectric sensor system having a transmitter and a receiver, and at least one aperture module configured to modify a nominal field of view (FOV) of the transmitter and/or receiver, such that an overlap between the transmitter and receiver FOVs is controlled. In an illustrative example, the aperture module may be a plate having respective receiver and transmitter apertures. The transmitter and/or receiver apertures may be aligned or slightly offset from respective transmitter and receiver optical axes. The transmitter and/or receiver apertures may have a specific size/shape/position that produces a custom predetermined FOV overlap. At least one registration/alignment pin may extend through the aperture plate, a baffle, and a lens module to control orientation. The photoelectric sensor system may advantageously (1) be more resistant to the "white card effect," (2) increase maximum sensor range, and (3) control the shape/size/overlap of the FOVs.

Various embodiments may achieve one or more advantages. For example, some embodiments may include a selectively removable aperture plate, which may advantageously allow the aperture plate to be field-replaceable and/or field-configurable. Various embodiments may include separate aperture plates, which may advantageously allow for an aperture associated with the transmitter to be configured independently of an aperture associated with the receiver (and vice-versa). An adjustable aperture system may advantageously allow for on-the-fly optimization of the apertures of a field-deployed photoelectric sensor system to provide better object detecting performance in a given set of environmental conditions.

The photoelectric sensor system may advantageously address the "white card" issue, while also providing reliable information of a retro signal reflected back toward the receiver in environments (e.g., dense smoke/humidity conditions) that may diminish the optical signal generated by the transmitter. A modified larger FOV overlap may advantageously result in a more rugged sensor system that maintains alignment while the transmitter/receiver module is experiencing displacement disturbances (e.g., due to high winds) off of alignment registration. An aperture module may advantageously change a photoelectric sensor system from a short to a long-range application. The registration/alignment pin may additionally extend through a printed circuit board (PCB) upon which the transmitter and/or receiver may be mounted. Because it is one single piece, the registration/alignment pin may advantageously act as a datum feature for the entire photoelectric sensor system.

The details of various embodiments are set forth in the accompanying drawings and the description below. Other features and advantages will be apparent from the description and drawings, and from the claims.

BRIEF DESCRIPTION OF THE DRAWINGS

FIGS. 3A, 3B, and 3C depicts a side elevational views of an exemplary photoelectric sensor system having transmitter/receiver apertures illustrating various modified transmitter/receiver FOVs.

Like reference symbols in the various drawings indicate like elements.

DETAILED DESCRIPTION OF ILLUSTRATIVE EMBODIMENTS

Figure 7:
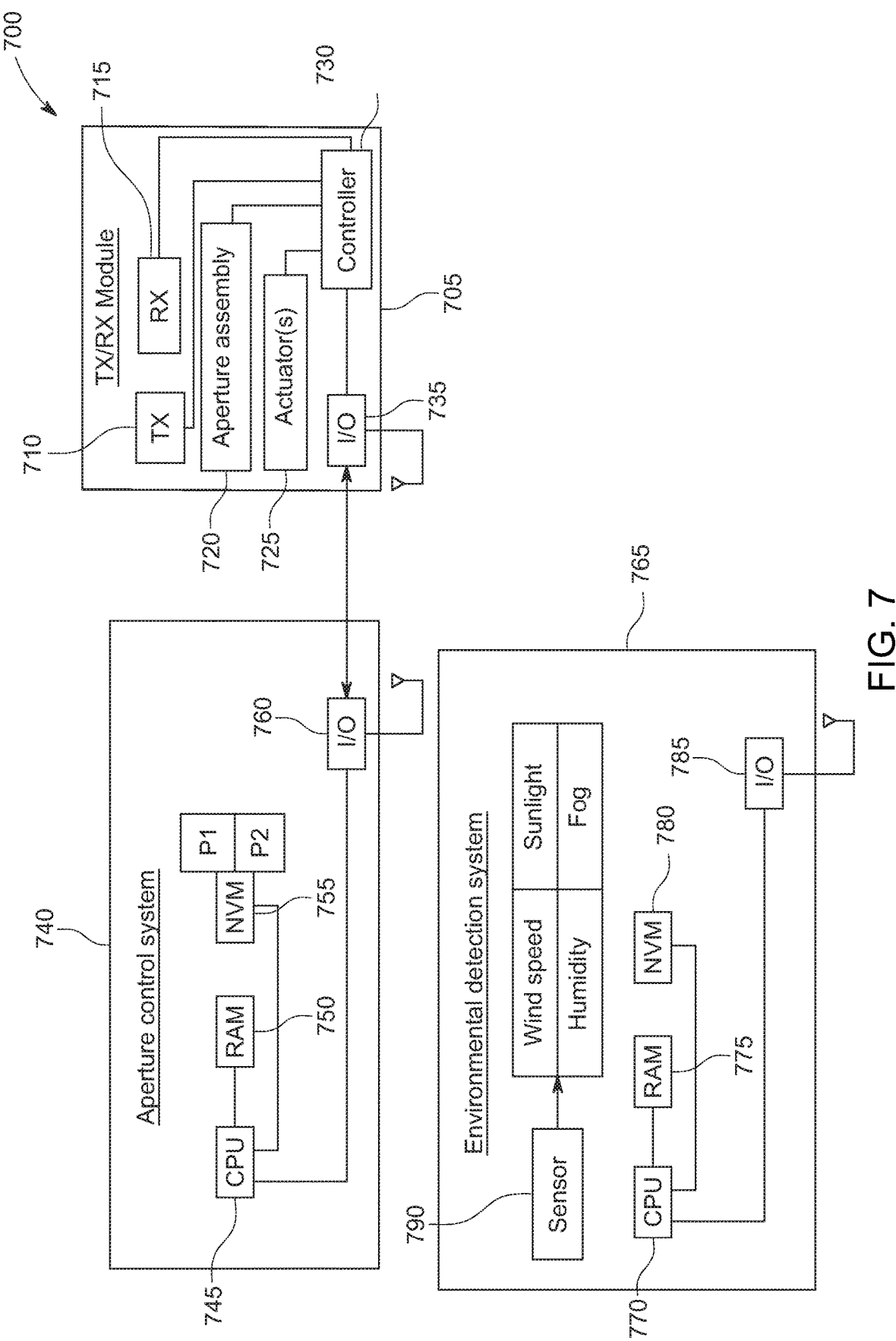
FIG. 7 depicts a block-diagram of an exemplary adjustable aperture system.
Figure 8A:
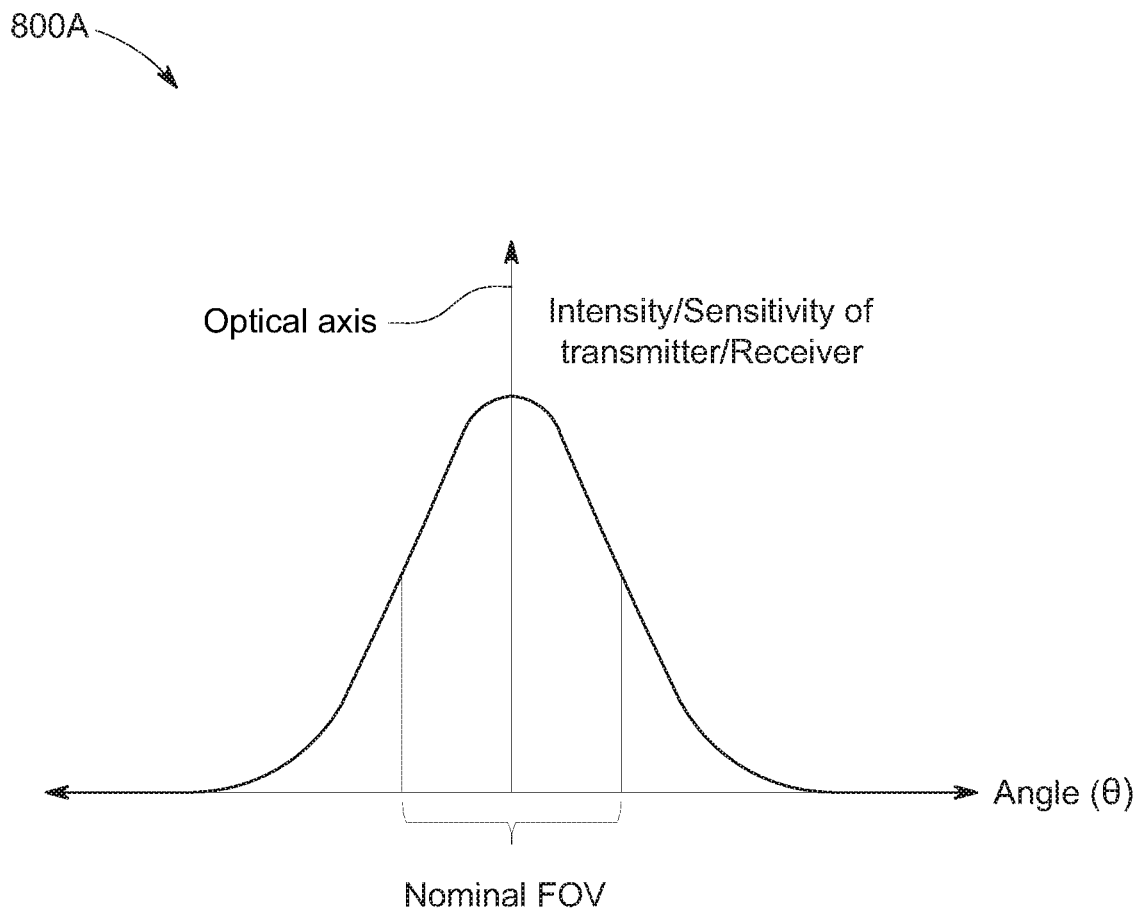
FIGS. 8A, 8B, and 8C depict exemplary optical beam distributions for a nominal transmitter/receiver FOV, an aligned-modified transmitter/receiver FOV, and an offset-modified transmitter/receiver FOV, respectively.
Figure 8B:
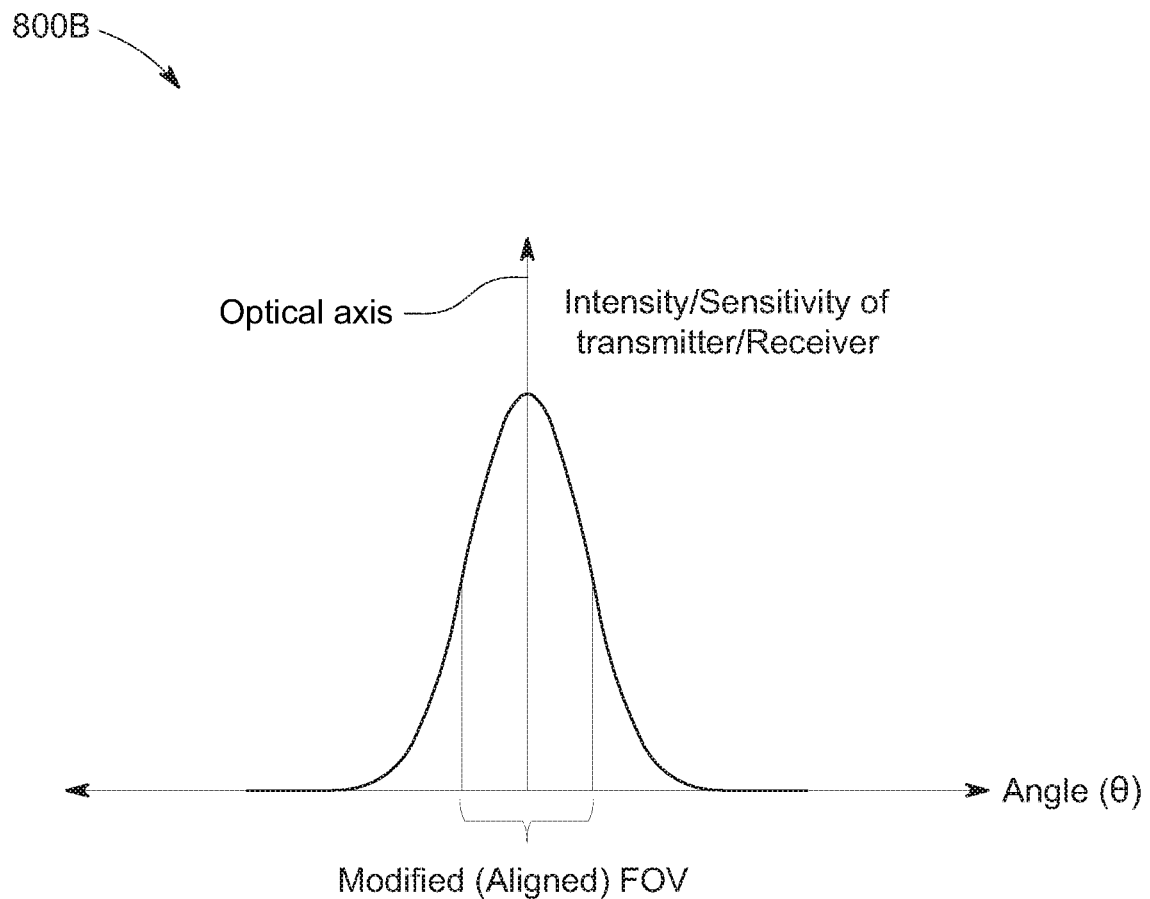
Figure 8C:
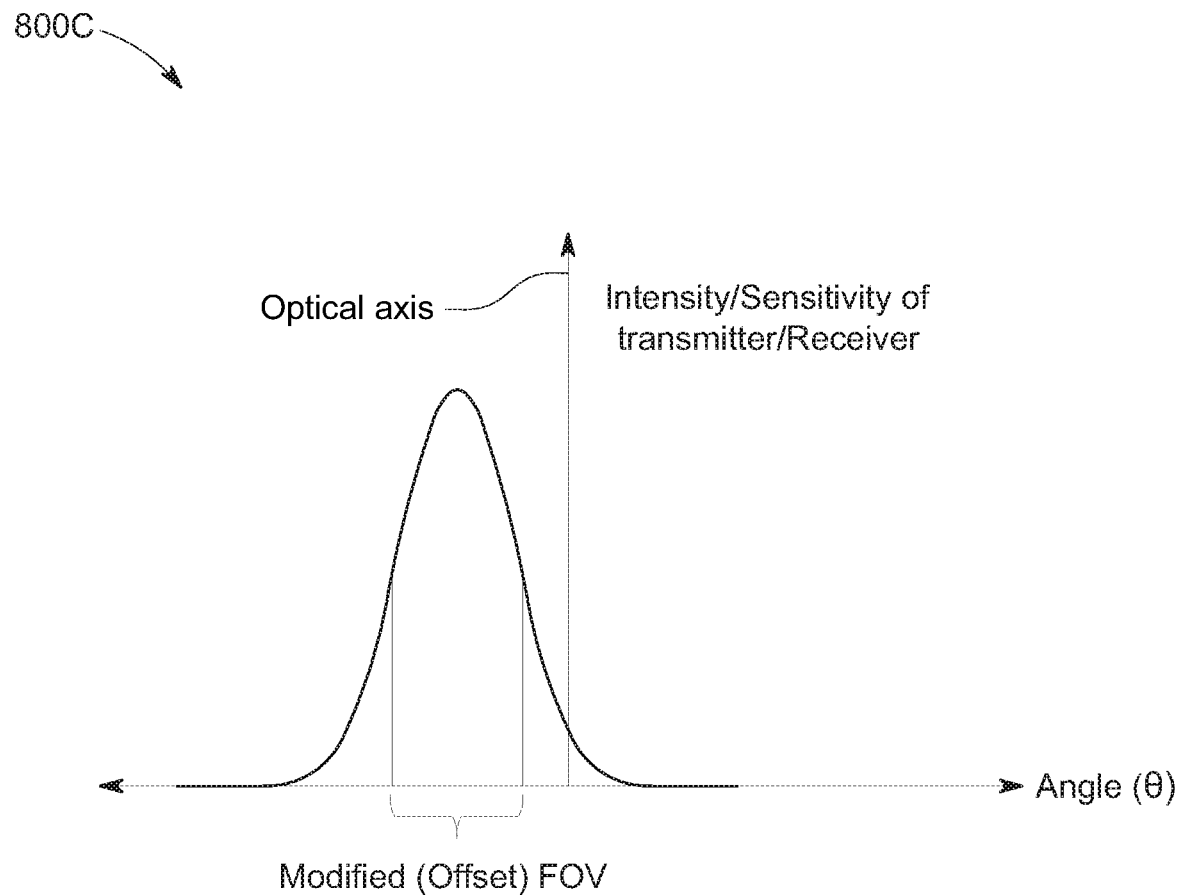
Figure 9:
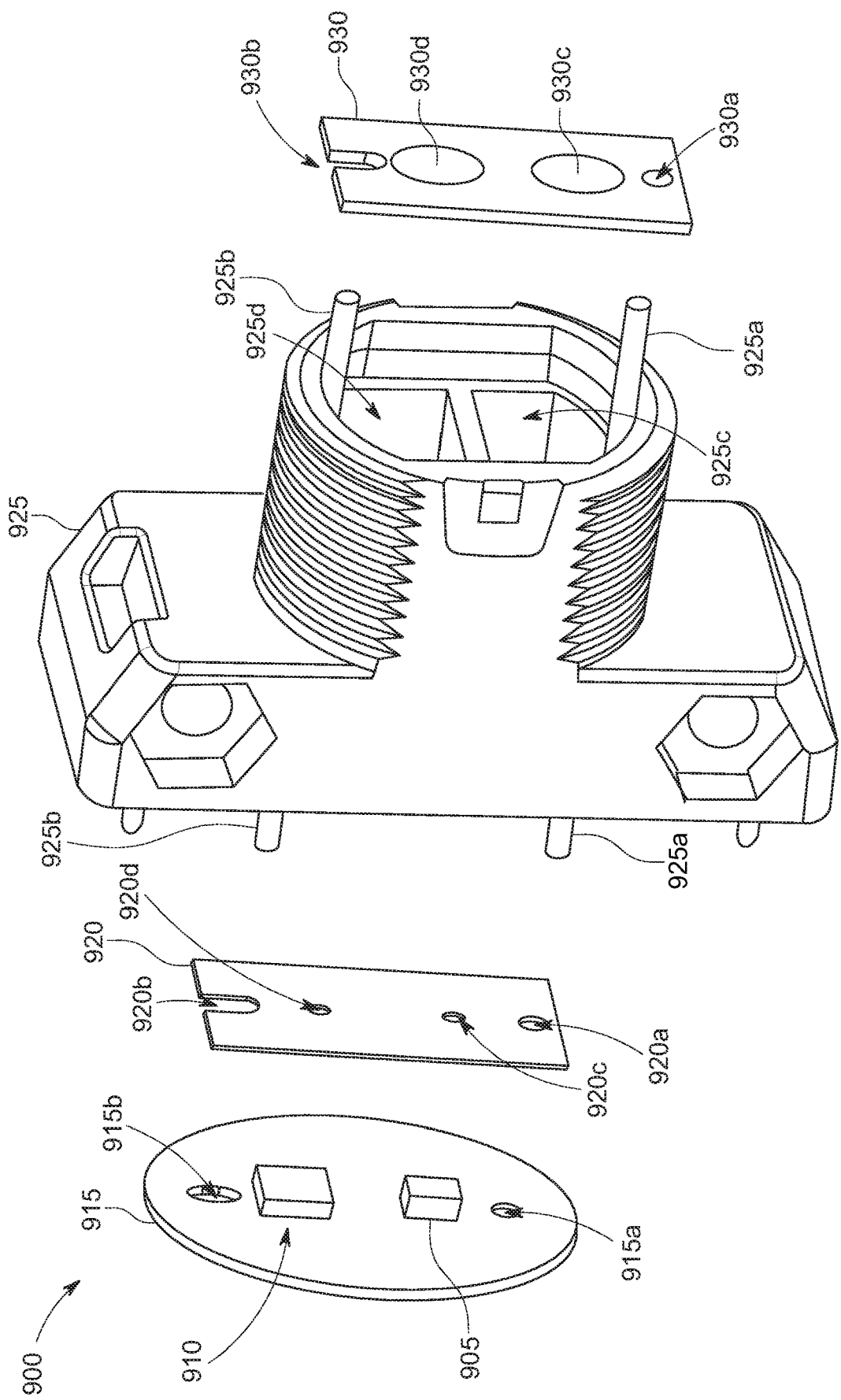
FIG. 9 depicts a perspective exploded view of an exemplary photoelectric sensor apparatus having an aperture plate and baffle with alignment pins.
Figure 10:
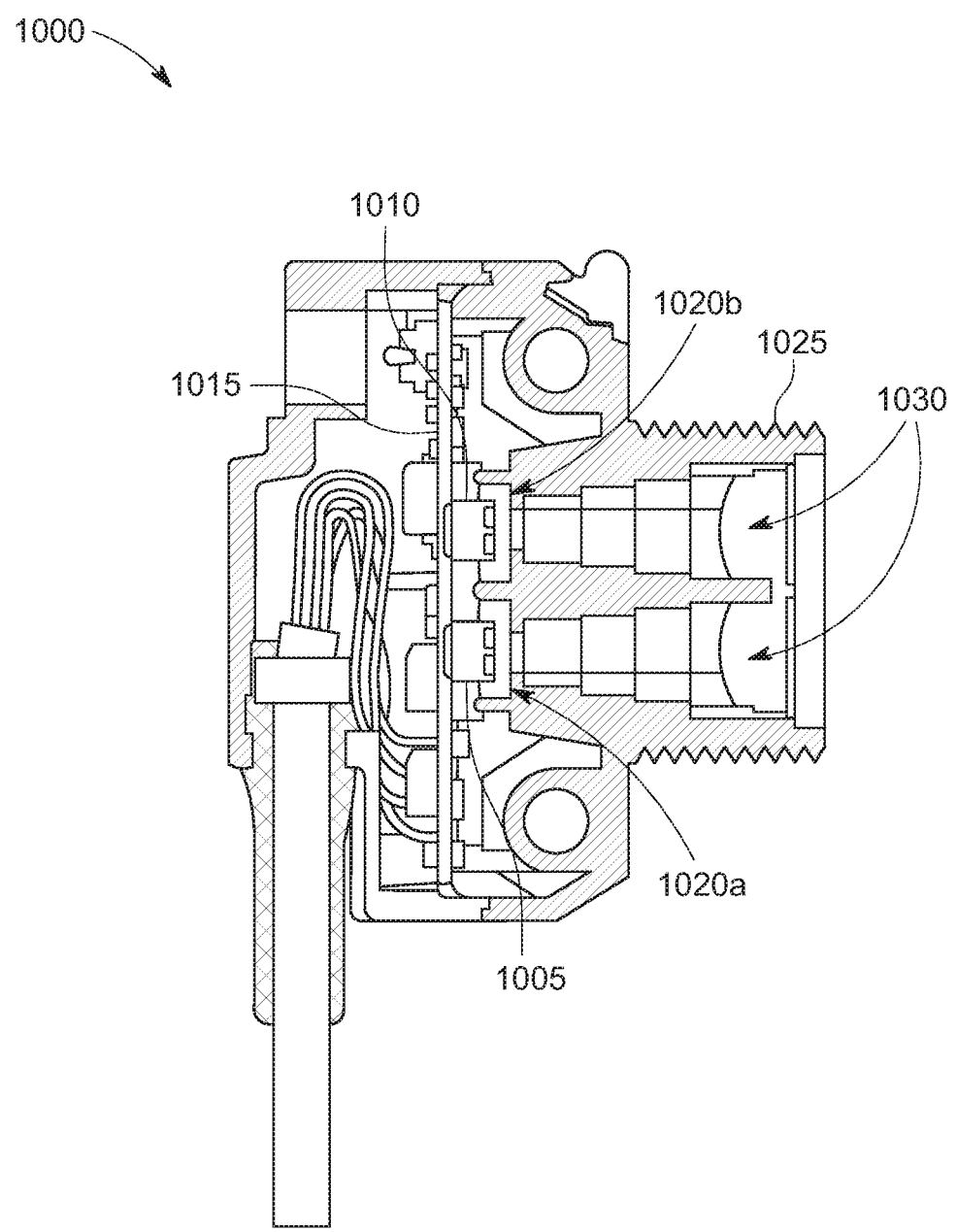
FIG. 10 depicts a side cross-sectional view of an exemplary photoelectric sensor apparatus having an aperture plate and baffle with alignment pins.

To aid understanding, this document is organized as follows. First, a photoelectric sensor deployment scenario is briefly introduced with reference to FIG. 1. Second, with reference to FIGS. 2-3C, the discussion turns to exemplary embodiments that illustrate a field of view (FOV) overlap between nominal/modified transmitter FOVs and nominal/modified receiver FOVs. Next, the discussion turns to describe various embodiments of a photoelectric sensor apparatus, with reference to FIGS. 4A-5. Next, various FOV overlaps for various combinations of transmitter/receiver apertures is introduced in FIGS. 6A-6B. In FIG. 7, a block diagram detailing an adjustable aperture system is disclosed. FIGS. 8A-8C depict graphs illustrating intensity levels for various FOVs. Next, FIGS. 9 and 10 depict an exemplary embodiment of a photoelectric sensor apparatus having an aperture plate and baffle with alignment pins. Finally, with reference to FIG. 11, multiple exemplary variations of an aperture plate are depicted, all or some of which may be included in an aperture and FOV customization kit.

Figure 1:
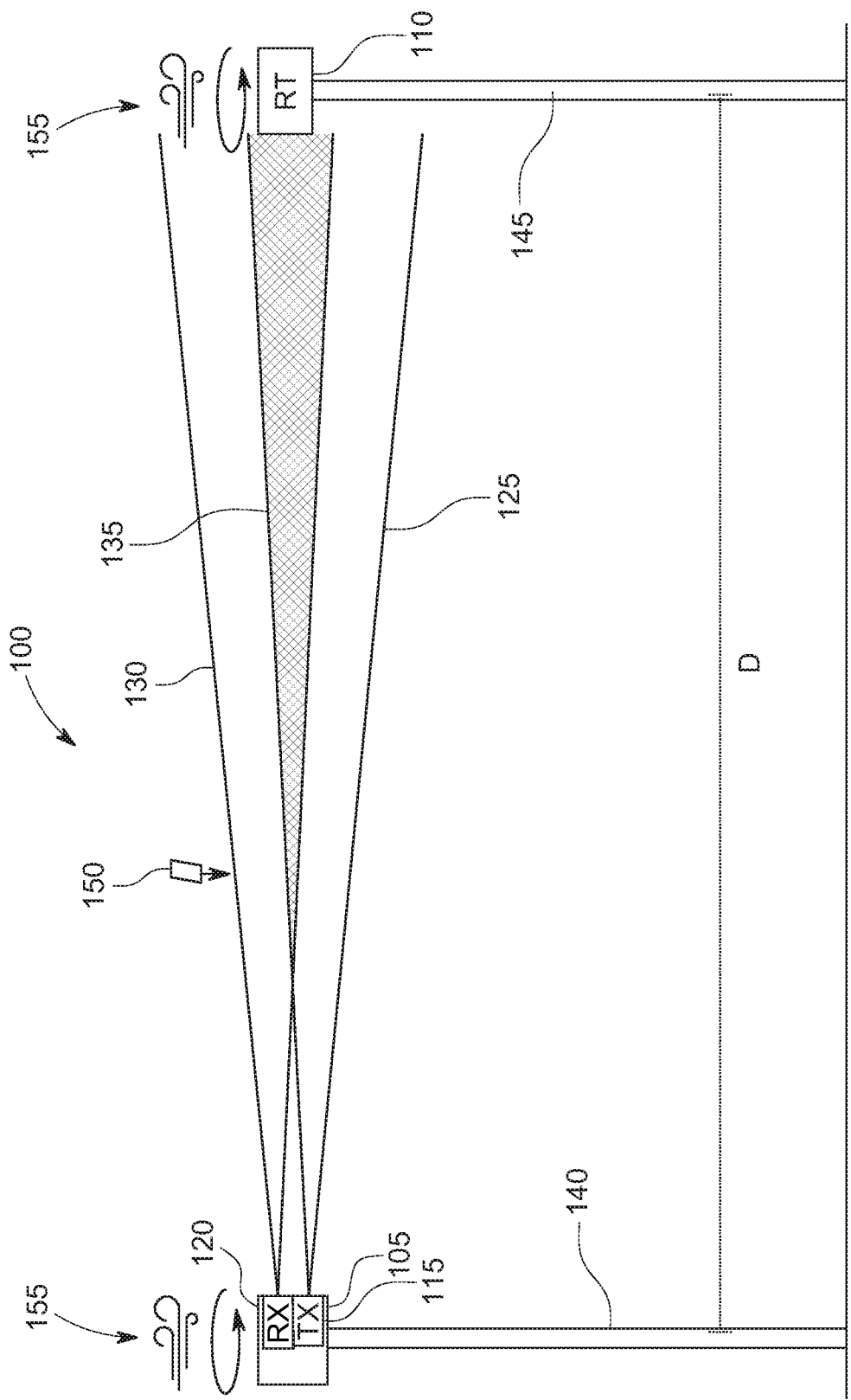
FIG. 1 depicts a side elevational view of an exemplary photoelectric sensor system illustrating long-range reflection and a white card test sample.

FIG. 1 depicts a side elevational view of an exemplary photoelectric sensor system illustrating long-range reflection and a white card test sample. A photoelectric sensor system 100 includes a transmitter/receiver module 105 and a retro target 110. The transmitter/receiver module 105 includes a transmitter (TX) 115 and a receiver (RX) 120. In some examples, the receiver 120 may a photodetector. In some embodiments, the transmitter 115 may be an emitter. In some embodiments, a transmitter may be an infrared (IR) emitter. The transmitter 115 has a nominal transmitter field of view (FOV) 125. The receiver 120 has a nominal receiver FOV 130. An overlap between the nominal transmitter FOV 125 and nominal receiver FOV 130 is indicated by the nominal TX/RX FOV overlap 135.

The transmitter/receiver module 105 is mounted atop a first vertical pole 140, while the retro target is mounted atop a second vertical pole 145. The transmitter/receiver module 105 and the retro target 110 are separated by distance D. In some examples, the distance D may be about 10, 15, 20, 25, 30, 40, 50, 60, 70, 80, 90, or about 100 ft. or more.

A white card test sample 150 is inserted into the space between the transmitter/receiver module 105 and the retro target 110. The white card 150 includes a white surface that may (back) scatter a high percentage of the light emitted by the transmitter 115 when that light is incident on the white surface. Some of the light (back) scattered by the white card 150 may be scattered back toward the receiver 120. As such, the white card 150 may cause the receiver 120 to receive a portion of light. This light received by the receiver scattered from the white card can be used to calibrate a predetermined light intensity threshold, to prevent the photoelectric sensor system 100 from registering no objects being present in the area between the transmitter/receiver module 105 and the retro target 110, when in reality, there is an object present in that area (e.g., the white card 150). Accordingly, the white card 150 may aid in properly calibrating the predetermined light intensity threshold for a photoelectric sensor system 100 to substantially mitigate false-sensing events that cause the photoelectric sensor system 100 to generate false-positive or false-negative indications.

In some examples, significant fluid flow disturbances may cause the vertical poles 140, 145 to sway in different directions. For example, wind gusts 155 may blow on the transmitter/receiver module 105, the retro target 110, and/or the poles 140, 145, such that the poles 140, 145 may be pushed in various directions. As such, the functioning of the photoelectric sensor system 100 may be adversely impacted by disturbances that alter the spatial relationship between the transmitter/receiver module 105 and the retro target 110.

Figure 2:
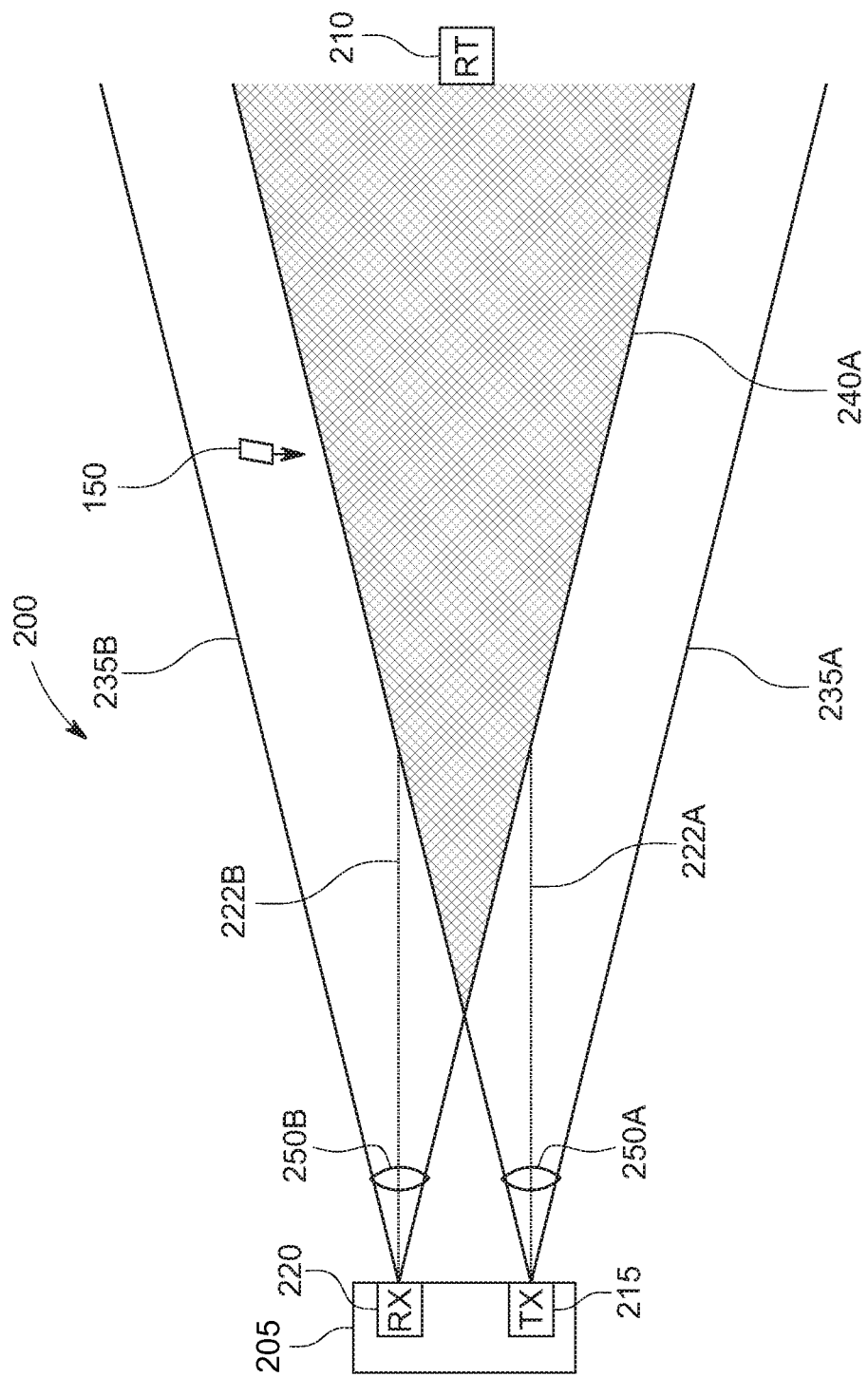
FIG. 2 depicts a side elevational view of an exemplary photoelectric sensor system without transmitter/receiver apertures illustrating a nominal transmitter/receiver fields of view (FOVs).

FIG. 2 depicts a side elevational view of an exemplary photoelectric sensor system without transmitter/receiver apertures illustrating a nominal transmitter/receiver fields of view (FOVs). A photoelectric sensor system 200 includes a transmitter/receiver module 205 and a retro target 210. The transmitter/receiver module 205 includes a transmitter (TX) 215 having a transmitter optical axis 222A, and a receiver (RX) 220 having a receiver optical axis 222B. A "natural" or "unmodified" FOV of the transmitter (e.g., the transmitter's FOV without modification by an aperture) is shown as a nominal transmitter FOV 235A. A "natural" or "unmodified" FOV of the receiver (e.g., the receiver's FOV without modification by an aperture) is shown as a nominal receiver FOV 235B. The resulting overlap between the nominal transmitter and nominal receiver FOVs 235A, 235B is a nominal FOV overlap 240A.

In this illustrative example, a white card 150 is placed between the transmitter/receiver module 205 and the retro target 210. The amount of light emitted by the transmitter 215 that is scattered back by the white card 150 towards the receiver 220 may be substantial due to the (relatively large) nominal FOV overlap 240A. Because the back scattering due to the white card 150 (e.g., white card signal) is substantial, the object detection thresholds of the receiver 205 may be set at higher levels due to the concern that a false-sensing event may occur. This higher threshold level may limit the effective range of the photoelectric sensor system to have a range significantly less than distance D. The power/amplitude of an (electromagnetic) wave falls with the distance R from the source as the square of the distance (inverse square law). As such, the photoelectric sensor system 200 may experience significant decay in an optical signal as the signal travels to/from the retro target 210. The result is that the optical signal reaching the receiver 220 may be significantly weaker the further the transmitter/receiver module 205 is from the retro target 210. Accordingly, a receiver 220 calibrated with a high light intensity threshold for object detection may prevent a photoelectric sensor system 200 from achieving operational ranges on the order of distance D.

The photoelectric sensor system 200 includes a first optical lens 250A located in front of the transmitter 215, and a second optical lens 250B located in front of the receiver 220. In some examples, the first optical lens 250A may be a collimating lens. In various embodiments, the second optical lens 250B may be a condensing lens (e.g., a "condenser"). A lens 250A may be configured to collimate an optical signal generated by the transmitter 215 along an incident optical path toward the retro target 210. A lens 250B may be configured to converge a reflected optical signal from a reflected optical path of the retro target 210 towards the receiver 220.

Figure 3A:
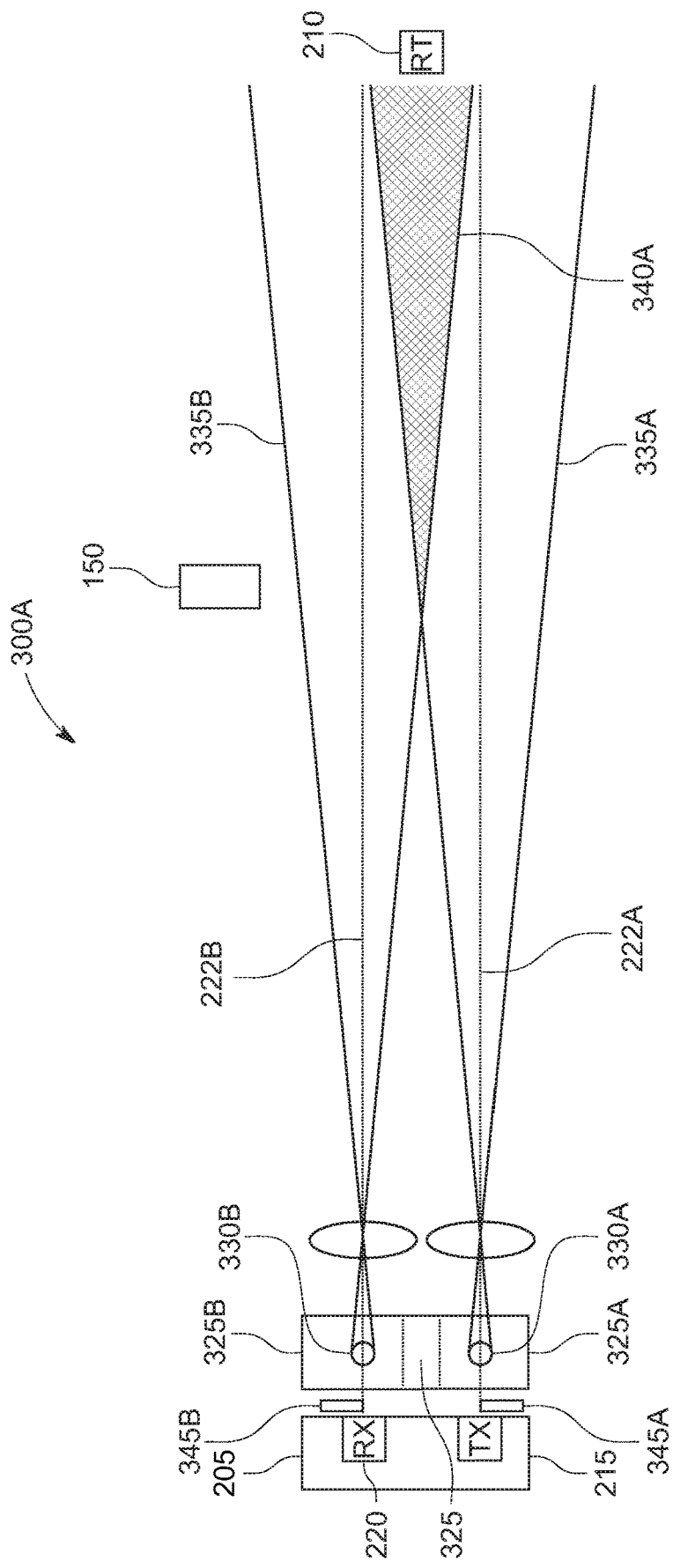
Figure 3B:
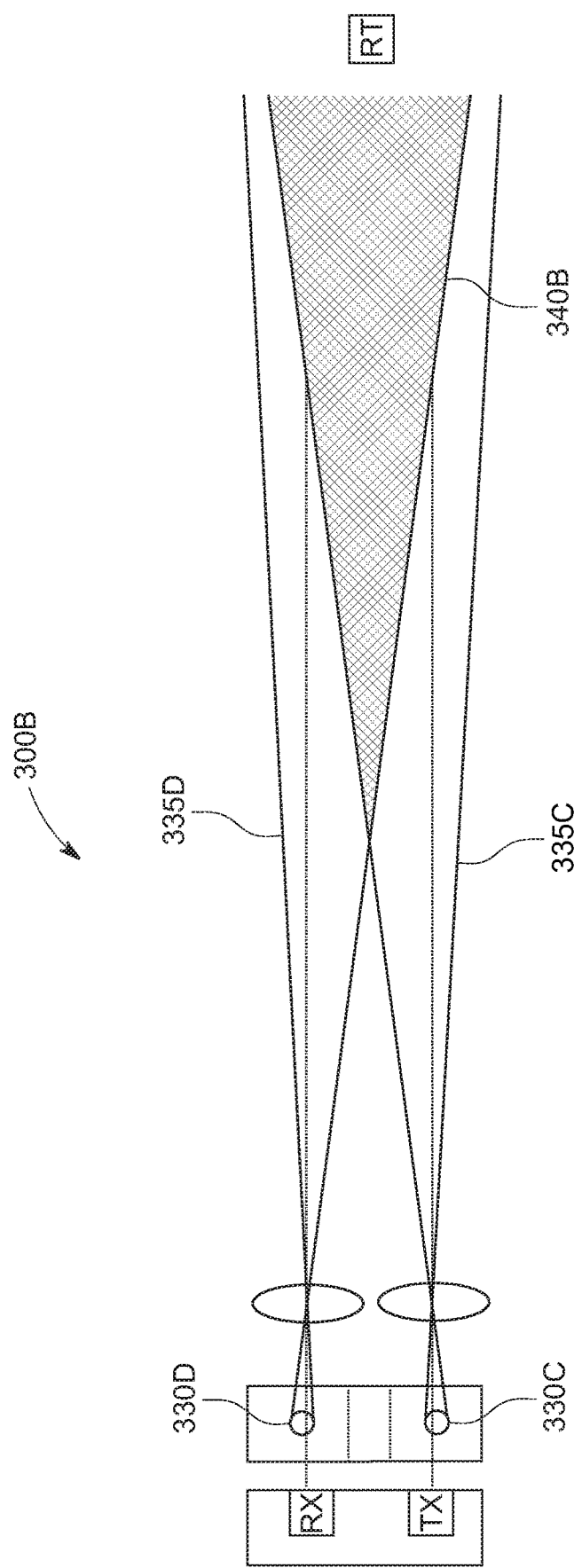

FIGS. 3A, 3B, and 3C depicts a side elevational views of an exemplary photoelectric sensor system having transmitter/receiver apertures illustrating various modified transmitter/receiver FOVs. A photoelectric sensor system 300A includes a transmitter/receiver module 205 and a retro target 210. The transmitter/receiver module 205 includes a transmitter (TX) 215 having a transmitter optical axis 222A, and a receiver (RX) 220 having a receiver optical axis 222B. Located in front of the transmitter 215 is a first aperture plate 325A. Located in front of the receiver 220 is a second aperture plate 325B. The first and second aperture plates 325A, 325B include respective first and second apertures 330A, 330B. In some embodiments, a single aperture plate 325 may be used instead of first and second aperture plates 325A, 325B, the single aperture plate 325 having multiple apertures (e.g., apertures 330A, 330B) that are closely controlled relative to each other.

In this exemplary embodiment, the first and second apertures 330A, 330B are respectively aligned with the transmitter and receiver optical axes 222A, 222B. The first aperture 330A is sized to modify the FOV of the transmitter from a nominal transmitter FOV (e.g., 235A) to a modified transmitter FOV 335A. The second aperture 330B is sized to modify the FOV of the receiver from a nominal receiver FOV (e.g., 235B) to a modified receiver FOV 335B. The resulting overlap between the modified transmitter and modified receiver FOVs 335A, 335B is a modified FOV overlap 340A. In some examples, the apertures 330A, 330B set the FOVs of the transmitter and receiver, respectively, such that the overlap of the FOVs is the FOV of the transmitter receiver module 205. In this exemplary depiction, the modified FOV overlap 340A is smaller than the nominal FOV overlap 240A.

The modified FOV overlap 340A may advantageously provide for a photoelectric sensor system 300A that is (1) more resistant to the "white card effect," while at the same time (2) provides for increased maximum sensor range (e.g., range on the order of distance D). In this illustrative example, a white card 150 is placed between the transmitter/receiver module 205 and the retro target 210. The amount of light emitted by the transmitter 215 that is scattered back by the white card 150 towards the receiver 220 may be substantially minimized due to the modified FOV overlap 340A. Because the back scattering due to the white card 150 (e.g., white card signal) is minimized, the object detection thresholds of the receiver 205 may be set at lower levels without the concern that a false-sensing event may occur.

This lower threshold level may allow for the photoelectric sensor system 300A to have a range on the order of distance D. The power/amplitude of an (electromagnetic) wave falls with the distance R from the source as the square of the distance (inverse square law). As such, a long range photoelectric sensor system 300A may experience significant decay in an optical signal as the signal travels to/from the retro target 210. As a result, the optical signal reaching the receiver 220 may be significantly weaker the further the transmitter/receiver module 205 is from the retro target 210. Accordingly, a receiver 220 having a lower light intensity threshold for object detection may allow for a photoelectric sensor system 300A to achieve ranges on the order of distance D. Put another way, because a lower threshold gives the receiver 220 higher sensitivity, this allows for a longer range photoelectric sensor system 300A (e.g., versus photoelectric sensor system 200).

Located proximate to the transmitter 215 is a first mask 345A. Located proximate to the receiver 220 is a second mask 345B. Masks 345A, 345B may be used in conjunction with the aperture plates 325A, 325B (or aperture plate 325) to block optical paths to/from the transmitter/receiver module 205. In this sense, the masks 345A, 345B may allow for improved thresholds to be set to permit the receiver 220 to better distinguish the presence of an object in the space between the transmitter/receiver module 205 and the retro target 210. Examples of masks may be found, for example, in cols. 4-5 and FIGS. 7-13 of Issued U.S. Pat. No. 6,946,643, titled "Retro-Reflective Photoelectric Sensor," filed by Robert Fayfield, on Jan. 17, 2003, the entire contents of which are herein incorporated by reference.

The photoelectric sensor system 300A includes a first optical lens 250A located in front of the transmitter 215, and a second optical lens 250B located in front of the receiver 220. In some examples, the first optical lens 250A may be a collimating lens. In various embodiments, the second optical lens 250B may be a condensing lens (e.g., a "condenser"). The lens 250A may be configured to collimate an optical signal generated by the transmitter 215 along an incident optical path toward the retro-reflective substrate. The lens 250B may be configured to converge a reflected optical signal from a reflected optical path of the retro target 210 towards the receiver 220.

A photoelectric sensor system 300B (FIG. 3B) includes a transmitter/receiver module 205 and a retro target 210. The transmitter/receiver module 205 includes a transmitter (TX) 215 having a transmitter optical axis 222A, and a receiver (RX) 220 having a receiver optical axis 222B. Located in front of the transmitter 215 is a first aperture plate 325A. Located in front of the receiver 220 is a second aperture plate 325B. The first and second aperture plates 325A, 325B include respective first and second apertures 330C, 330D. In some embodiments, a single aperture plate 325 may be used instead of first and second aperture plates 325A, 325B, the single aperture plate 325 having multiple apertures (e.g., apertures 330C, 330D) that are closely controlled relative to each other.

The first and second apertures 330C, 330D are respectively offset from alignment with the transmitter and receiver optical axes 222A, 222B (e.g., the apertures 330C, 330D are moved further away from each other compared to the apertures 330A, 330B of FIG. 3A). The first aperture 330C is sized and positioned to modify and redirect the FOV of the transmitter from a nominal transmitter FOV (e.g., 235A) to a modified, redirected transmitter FOV 335C. The second aperture 330D is sized and positioned to modify and redirect the FOV of the receiver from a nominal receiver FOV (e.g., 235B) to a modified, redirected receiver FOV 335D. The resulting overlap between the modified/redirected transmitter and modified/redirected receiver FOVs 335C, 335D is a modified FOV overlap 340B.

In some examples, the apertures 330C, 330D set the FOVs of the transmitter and receiver, respectively, such that the overlap of the FOVs is the FOV of the transmitter receiver module 205. In the exemplary depiction of FIG. 3B, the modified FOV overlap 340B is larger in width versus the modified FOV overlap 340A (due to the more distant spacing of apertures 330C, 330D). The modified FOV overlap 340B may advantageously provide for a photoelectric sensor system 300B that has wider FOV but (1) is less resistant to the "white card effect" and (2) has decreased maximum sensor range (e.g., versus system 300A).

A photoelectric sensor system 300C (FIG. 3C) includes a transmitter/receiver module 205 and a retro target 210. The transmitter/receiver module 205 includes a transmitter (TX) 215 having a transmitter optical axis 222A, and a receiver (RX) 220 having a receiver optical axis 222B. Located in front of the transmitter 215 is a first aperture plate 325A. Located in front of the receiver 220 is a second aperture plate 325B. The first and second aperture plates 325A, 325B include respective first and second apertures 330E, 330F. In some embodiments, a single aperture plate 325 may be used instead of first and second aperture plates 325A, 325B, the single aperture plate 325 having multiple apertures (e.g., apertures 330E, 330F) that are closely controlled relative to each other.

The first aperture 330E is aligned with the transmitter optical axis 222A, while the second aperture 330F is offset from alignment with the receiver optical axes 222B. The second aperture 330F is closer to the first aperture 330E versus the apertures 330A, 330B of FIG. 3A (e.g., the second aperture 330F is closer to the center of the system, or midpoint between the transmitter and receiver 215, 220). The first aperture 330E is also larger in size than the second aperture 330F. The first aperture 330E is sized and positioned to modify the FOV of the transmitter from a nominal transmitter FOV (e.g., 235A) to a modified transmitter FOV 335E. The second aperture 330F is sized and positioned to modify and redirect the FOV of the receiver from a nominal receiver FOV (e.g., 235B) to a modified, redirected receiver FOV 335F. The resulting overlap between the modified/redirected transmitter and modified/redirected receiver FOVs 335E, 335F is a modified FOV overlap 340C.

In some examples, the apertures 330E, 330F set the FOVs of the transmitter and receiver, respectively, such that the overlap of the FOVs is the FOV of the transmitter receiver module 205. In this exemplary depiction, the modified FOV overlap 340C is smaller than the modified FOV overlaps 340A, 340B. The modified FOV overlap 340C may advantageously provide for a photoelectric sensor system 300C that is (1) more resistant to the "white card effect," while at the same time (2) provides for increased maximum sensor range (e.g., range on the order of distance D or more). The result may provide for increased range at the expense of a smaller FOV.

Figure 4A:
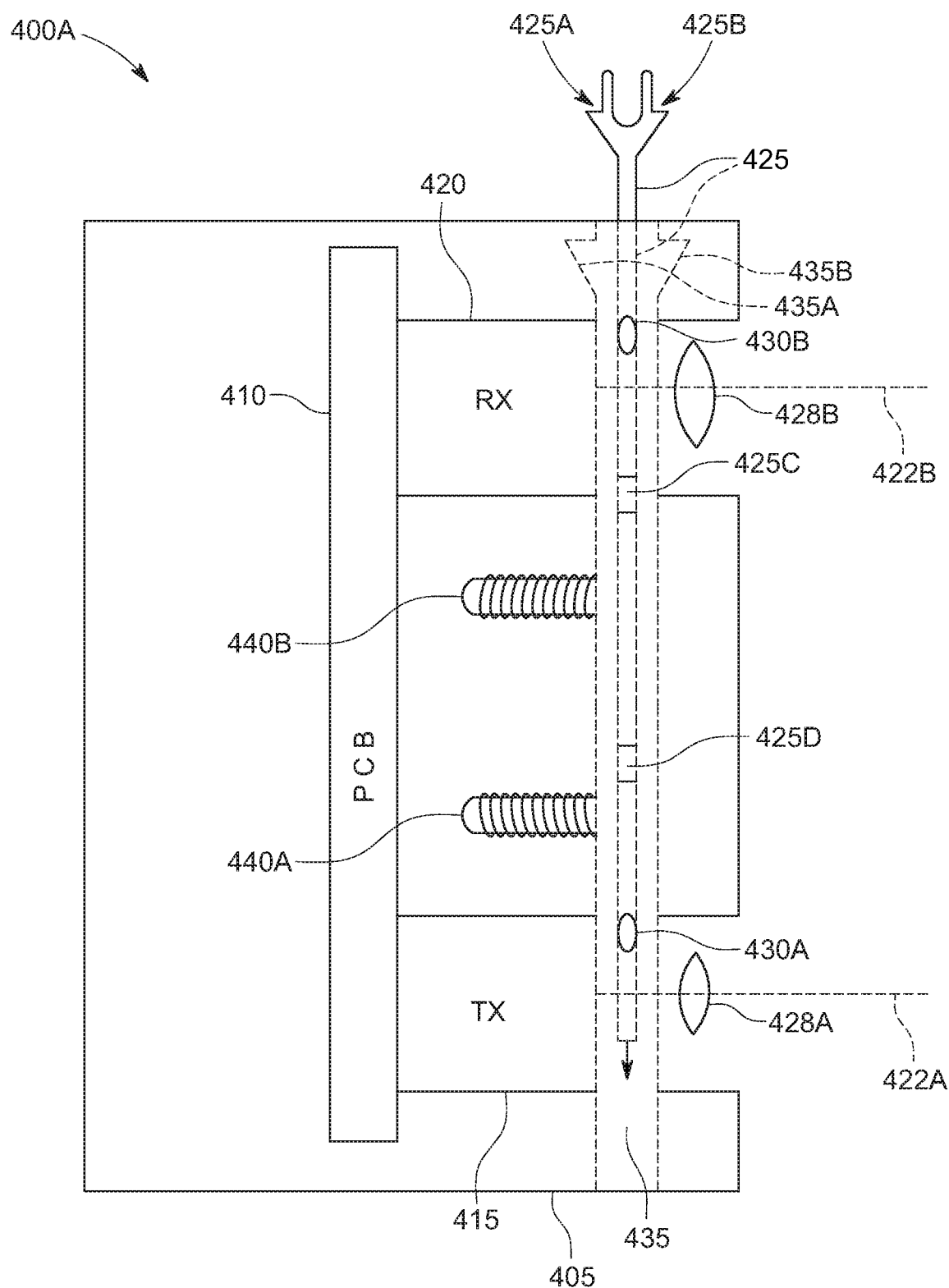
FIG. 4A depicts a side cross-sectional view of an exemplary photoelectric transmitter/receiver apparatus having an aperture plate.

FIG. 4A depicts a side cross-sectional view of an exemplary photoelectric transmitter/receiver apparatus having an aperture plate. A photoelectric transmitter/receiver apparatus 400A includes a transmitter/receiver module 405. The transmitter/receiver module 405 includes a transmitter (TX) 415 and a receiver (RX) 420 fixedly coupled to a printed circuit board 410. Located in front of the transmitter 415 and receiver 420 is an aperture plate 425. Also located in front of the transmitter 415 and receiver 420 (respectively) are lenses 428A, 428B. The aperture plate 425 includes first and second apertures 430A, 430B. The aperture plate 425 is being inserted into an aperture plate slot 435. When the aperture plate 425 is fully inserted into the aperture plate slot 435, the first and second apertures 430A, 430B are respectively aligned (or offset from alignment) with the transmitter and receiver optical axes 422A, 422B.

The aperture plate 425 may be removably inserted and selectively locked in the aperture plate slot 435 using a variety of mechanisms. In this illustrative example, the aperture plate 425 includes a pair of locking clips 425A, 425B that respectively mate with a pair of locking recesses 435A, 435B of the aperture plate slot 435 to selectively lock the aperture plate 425 in a fixed position inside of the aperture plate slot 435. The aperture plate 425 includes a pair of holes 425C, 425D that respectively mate with a pair of spring-biased locking pins 440A, 440B to selectively lock the aperture plate 425 in a fixed position inside of the aperture plate slot 435. A user may disengage the locking clips and/or spring-biased locking pins to remove a given aperture plate from the aperture plate slot and replace it with another (different) aperture plate. As such, the aperture plate may have a catch mechanism that allows the aperture plate to be aligned properly and locked into place in the aperture plate slot. In this sense, the aperture plate may be slidably and selectively removable from the aperture plate slot, advantageously allowing the aperture plate to be field-replaceable and field-configurable. Accordingly, a user may pick a given aperture plate (having different sizes/shapes/positions for apertures) that may better suit a specific use case or environmental conditions.

Figure 4B:
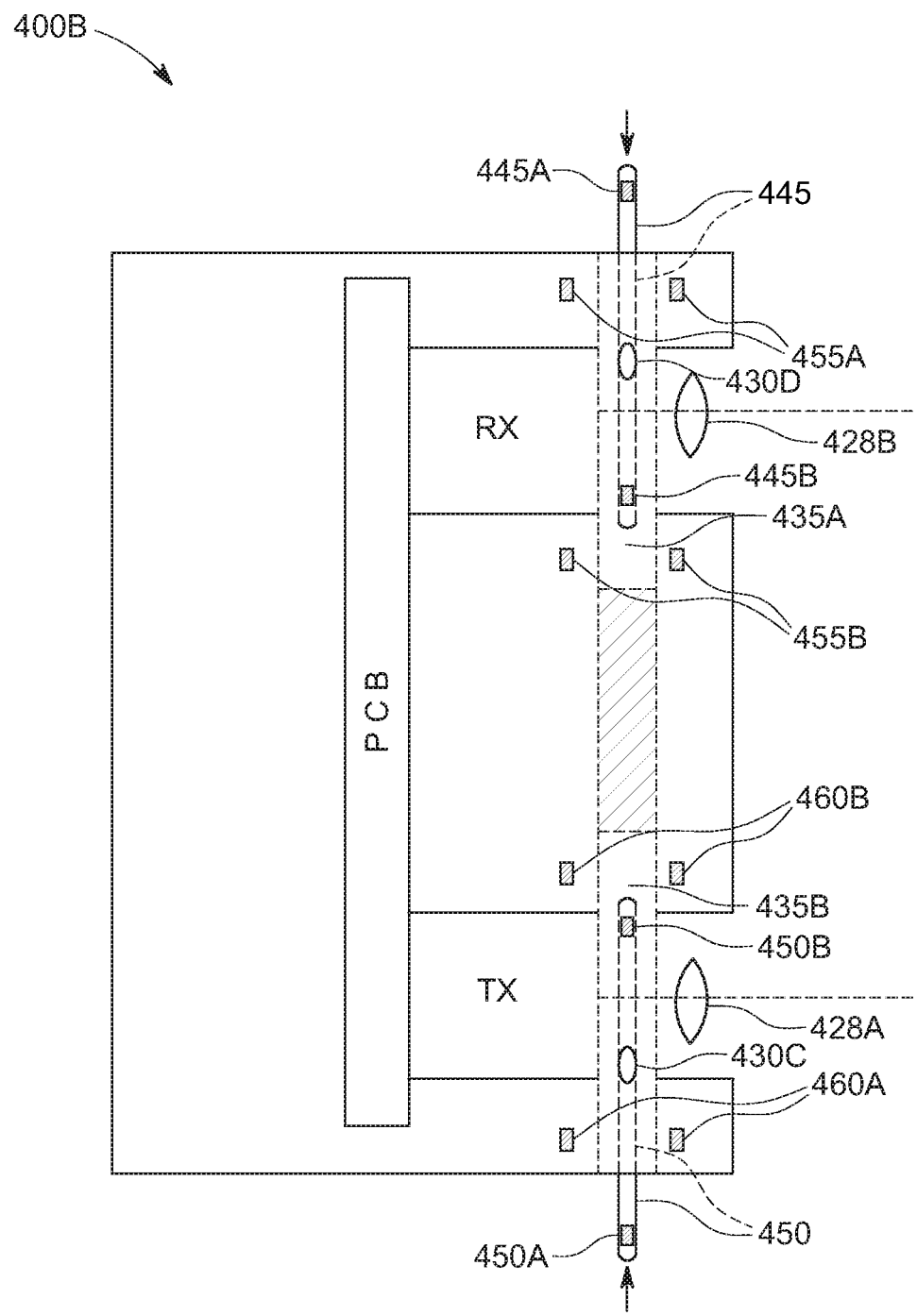
FIG. 4B depicts a side cross-sectional view of an exemplary photoelectric transmitter/receiver apparatus having two aperture plates.

FIG. 4B depicts a side cross-sectional view of an exemplary photoelectric transmitter/receiver apparatus having two aperture plates. A photoelectric transmitter/receiver apparatus 400B includes a transmitter/receiver module 405. The transmitter/receiver module 405 includes a transmitter (TX) 415 and a receiver (RX) 420 fixedly coupled to a printed circuit board 410. Located in front of the receiver 420 is a first aperture plate 445. Located in front of the transmitter 415 is a second aperture plate 450. Also located in front of the transmitter 415 and receiver 420 (respectively) are lenses 428A, 428B. The aperture plates 445, 450 include respective first and second apertures 430D, 430C. The first aperture plate 445 is being inserted into a first aperture plate slot 435A, while the second aperture plate 450 is being inserted into a second aperture plate slot 435B.

When the first aperture plate 445 is fully inserted into the first aperture plate slot 435A, the first aperture 430D is aligned (or offset from alignment) with the receiver optical axis 422B. When the second aperture plate 450 is fully inserted into the second aperture plate slot 435B, the second aperture 430C is aligned (or offset from alignment) with the transmitter optical axis 422A. A photoelectric transmitter/receiver apparatus 400B including separate aperture plates 445, 450 may advantageously allow for an aperture associated with the transmitter to be configured independent of an aperture associated with the receiver (and vice-versa). As such, a user may customize the photoelectric transmitter/receiver apparatus 400B to suit a variety of different situations. For example, a user may find that optimal performance for a given set of conditions may be achieved using a first aperture plate with a specific aperture size/shape/position, and no second aperture plate.

The aperture plates 445, 450 may be removably inserted and selectively locked in respective aperture plate slots 435A, 435B using a variety of mechanisms. In this illustrative example, the first aperture plate 445 includes a pair of magnets 445A, 445B that respectively magnetically couple with pairs of magnets 455A, 455B of the first aperture plate slot 435A to selectively lock the aperture plate 445 in a fixed position inside of the first aperture plate slot 435A. The second aperture plate 450 includes a pair of magnets 450A, 450B that respectively magnetically couple with pairs of magnets 460A, 460B of the second aperture plate slot 435B to selectively lock the second aperture plate 450 in a fixed position inside of the second aperture plate slot 435B. In this sense, the aperture plates 445, 450 may be slidably and selectively removable from respective the aperture plate slots 435A, 435B, advantageously allowing the aperture plates to be field-replaceable and field-configurable.

Figure 5:
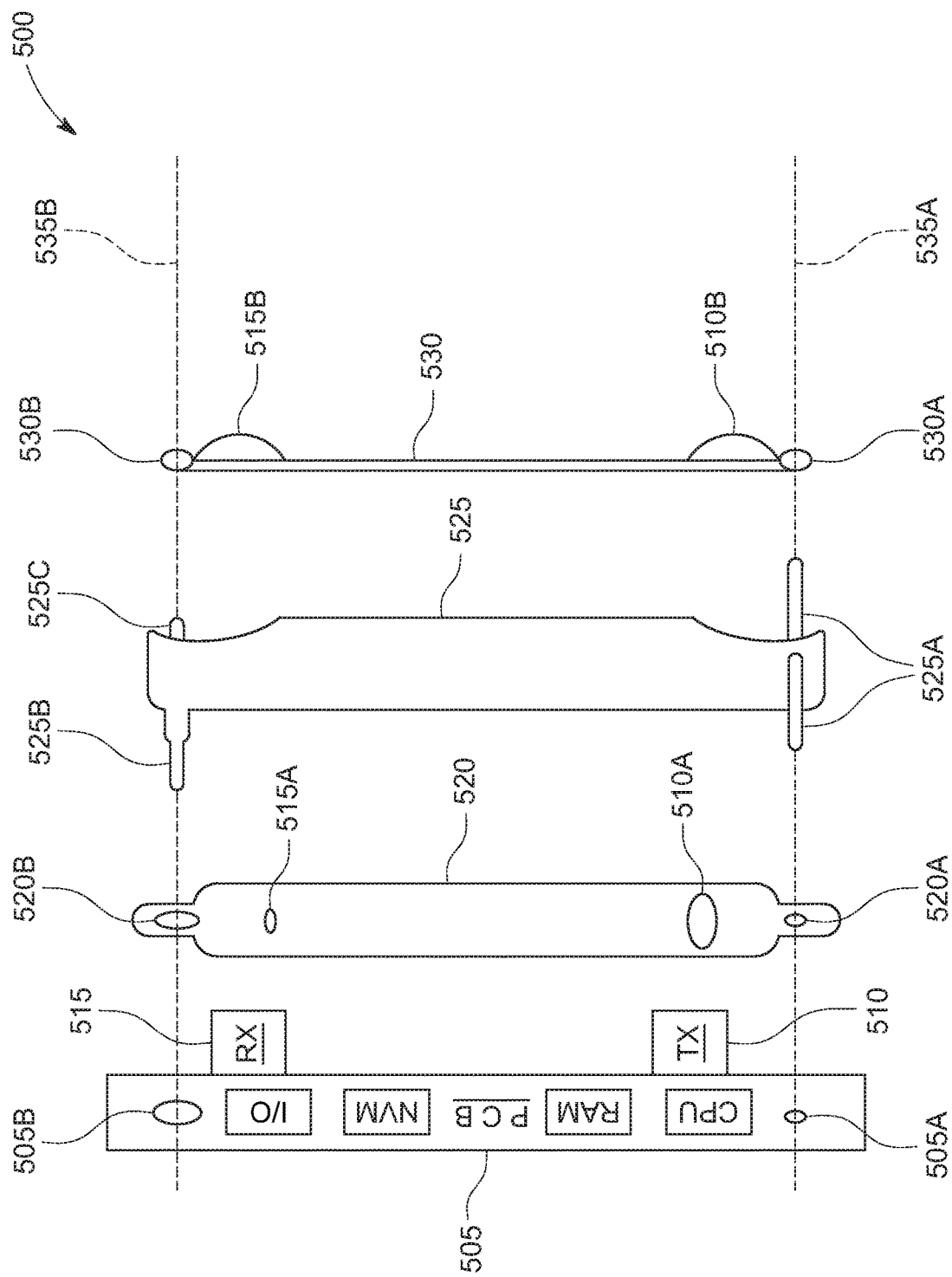
FIG. 5 depicts a side exploded view of an exemplary photoelectric transmitter-receiver apparatus having a baffle with a registration/alignment pin that registers a printed circuit board (PCB), aperture plate, baffle and lens into proper alignment with one another.

FIG. 5 depicts a side exploded view of an exemplary photoelectric transmitter-receiver apparatus having a baffle with a registration/alignment pin that registers a printed circuit board (PCB), aperture plate, baffle and lens into proper alignment with one another. An exploded photoelectric transmitter-receiver apparatus 500 includes a printed circuit board (PCB) 505. The PCB 505 includes a first hole 505A and a second hole 505B, where the second hole 505B may be slotted. Fixedly and operably coupled to the PCB 505 is a transmitter 510 and a receiver 515. In some examples, the PCB 505 may include various computing components (e.g., a CPU, RAM, NVM, and I/O). These computing components may operate with the transmitter 510 and the receiver 515 to perform various object detection functions. For example, the CPU may receive a receiver signal from the receiver 515 that indicates how much transmitted light from the transmitter 510 is being received at the receiver 515. The CPU may then compare this receiver signal to a predetermined light intensity threshold to determine whether an object is present in a monitored space (e.g., the space between a transmitter/receiver module and a retro target). In some examples, a white card test sample may be used to calibrate predetermined object detection thresholds that may be stored in the NVM of the PCB 505.

An exploded photoelectric transmitter-receiver apparatus 500 includes an aperture plate 520. The aperture plate 520 includes a first hole 520A and a second hole 520B wherein the second hole 505B may be slotted. The aperture plate 520 includes a transmitter aperture 510A and a receiver aperture 515A. In this depicted example, the apertures 510A, 515A are ellipse-shaped, the first aperture 510A is larger than the second aperture 515A, the first aperture is aligned with an optical axis of the transmitter 510, and the second aperture 515A is offset from alignment with an optical axis of the receiver 515.

An exploded photoelectric transmitter-receiver apparatus 500 includes a baffle 525. The baffle 525 includes a registration/alignment pin 525A, a first coupling pin 525B, and a second coupling pin 525C. In some examples, the baffle 525 may be an injection molded part. The registration pin 525A may be a metallic pin, while the first and second coupling pins 525B, 525C may be injection molded and integrally formed with the baffle 525. In some examples, the second and third coupling pins 525B, 525C may be a single (metallic) pin (e.g., similar to the registration pin 525A). The pins 525A, 525B, 525C are configured to couple and properly align the various components of the exploded photoelectric transmitter-receiver apparatus 500, as will be described below.

An exploded photoelectric transmitter-receiver apparatus 500 includes a lens module 530. The lens module 530 includes a first hole 530A and a second hole 530B wherein the second hole 530B may be slotted. The lens module 530 includes a transmitter lens 510B and a receiver lens 515B. In some examples, the lens module 530 may be referred to as a "bifurcated lens" (e.g., two lenses that are combined into a single piece).

When the parts of the exploded photoelectric transmitter-receiver apparatus 500 are assembled together, they may be coupled, registered, and aligned by use of the pins 525A, 525B, 525C. In this depicted embodiment, the holes 505A, 520A, and 530A are configured to receive the registration pin 525A, the holes 505B, 520B are configured to receive the first coupling pin 525B, and the hole 530B is configured to receive the second coupling pin 525C. In some examples, the holes 505B, 520B, and 530B may be configured to receive a combined first/second coupling pin.

When the pins of the baffle 525 are coupled to the holes of the PCB 505, aperture plate 520, and lens module 530, the pins may lock the PCB 505, aperture plate 520, and lens module 530 into fixed positions relative to one another and properly align the optical components of the (assembled) photoelectric transmitter-receiver apparatus 500. For example, a properly aligned aperture plate 520 may precisely control the shapes and relative positions of the apertures 510A, 515A, that in turn precisely controls the FOV overlap of the transmitter 510 and receiver 515. In some examples, a small change (e.g., 10's of microns) in aperture spacing may measurably change the performance of the sensor. In this sense, a registration pin that extends through the PCB, aperture plate, baffle and lens may advantageously control the orientation and alignment of the various components to optimize FOVs of a photoelectric system.

In various examples, the holes 505A, 520A, and 530A may be "tight tolerance" holes configured to precisely fit with the pin 525A. In some examples, the pin 525A may be a metallic (e.g., steel) pin. In various embodiments, the holes 505B, 520B, and 530B may be "loose tolerance" holes (or slotted holes that constrain motion in only one direction) configured to loosely fit with the pins 525B, 525C. In various examples, the pin 525A may register with the holes 505A, 520A, and 530A to provide proper alignment of the components of the apparatus 500. In various embodiments, one set of holes may be "tight tolerance" holes corresponding to a "tight tolerance" pin, while another set of holes may be "loose tolerance" holes corresponding to a "loose tolerance" pin (or pins). In various examples, the pin 525A may be located at various points along the baffle 525 (e.g., the pin 525A may be located at the opposite end of the baffle 525). In examples where there are two aperture plates, the baffle 525 may two registration pins 525A configured to properly align each aperture plate with the transmitter/receiver and lenses.

In some examples, the baffle 525 may be designed to place the plate 520 at a specific distance from the lens module 530. For example, the lenses 510B, 515B may have specific back focal lengths that require the apertures 510A, 515A to be located at a precise focal distance from the lenses 510B, 515B. The baffle 525 may provide for a precise spacing between the lenses 510B, 515B and the transmitter and receiver 510, 515, respectively. In various examples, the lenses 510B, 515B may be respectively aligned with the optical axes of the transmitter 510 and the receiver 515. In some embodiments, the lenses 510B, 515B may be offset from the optical axes of the transmitter 510 and the receiver 515 (e.g., instead of the apertures 515A, 510A).

Figure 6A:
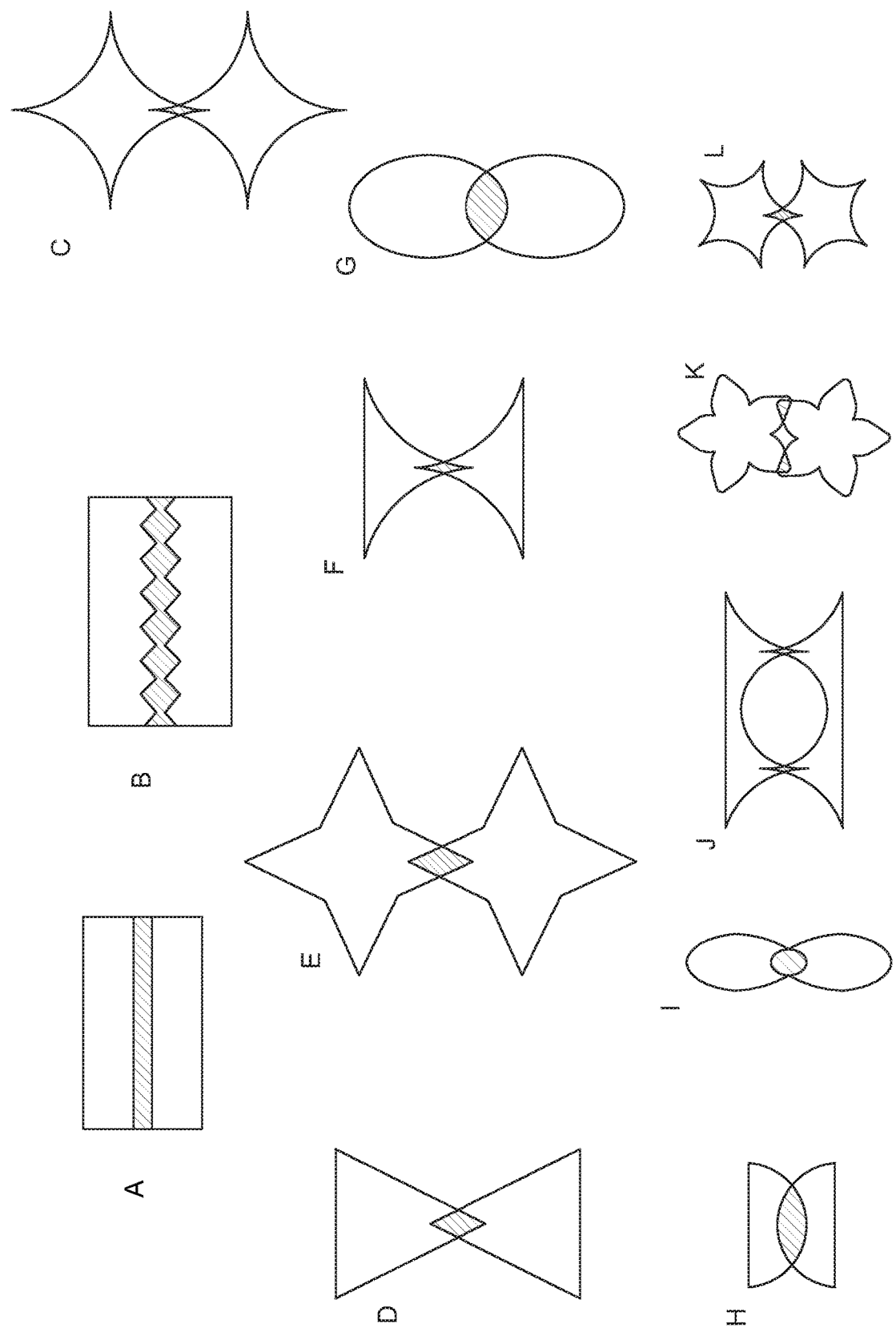
FIGS. 6A and 6B depict cross-sectional views of exemplary receiver and emitter field of views (FOVs), where the overlap between the receiver and emitter FOVs is indicated by dark shading.
Figure 6B:
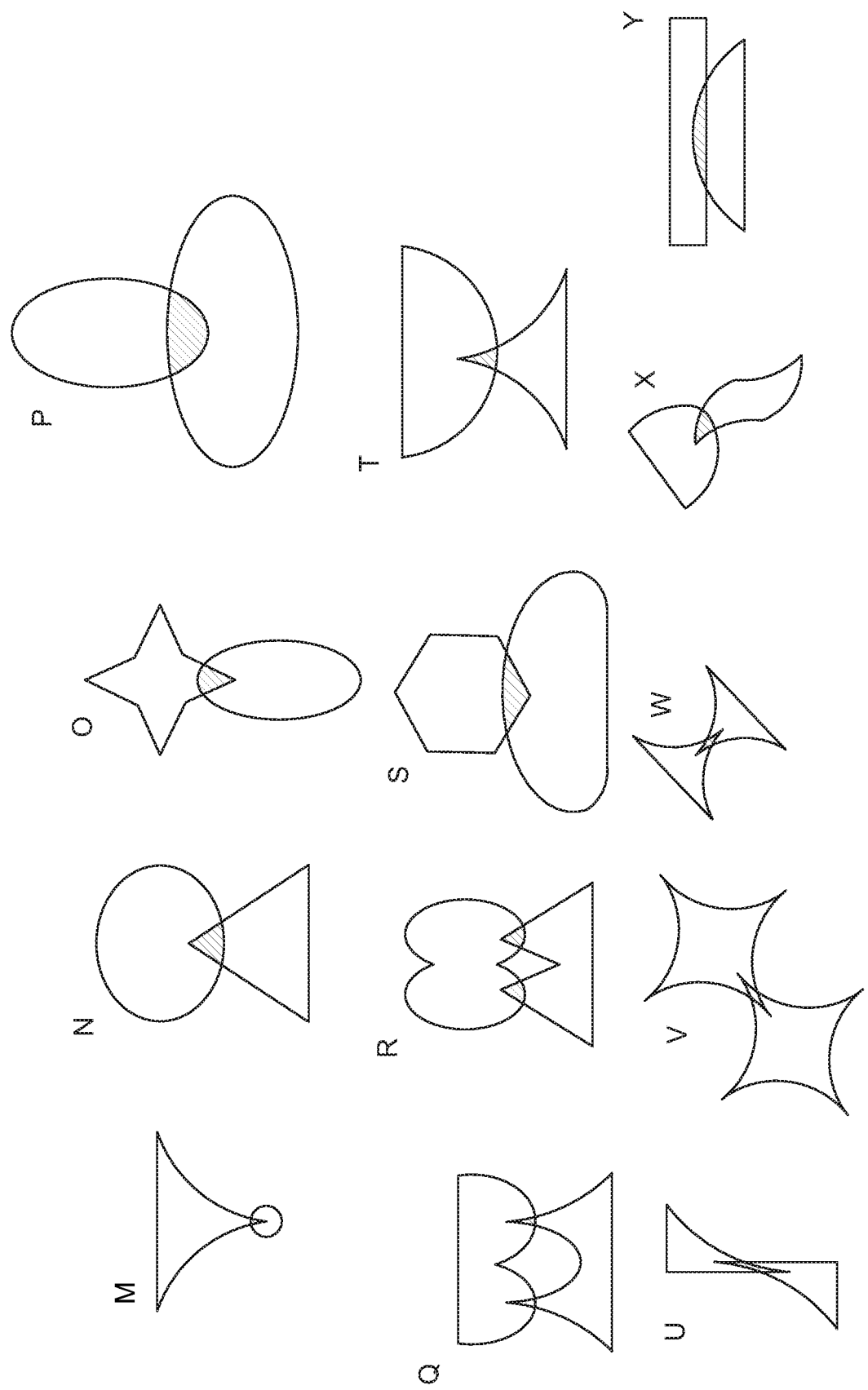

FIGS. 6A and 6B depict cross-sectional views of exemplary receiver and emitter field of views (FOVs), where the overlap between the receiver and emitter FOVs is indicated by dark shading. Each FOV depicted may either be an emitter FOV or a receiver FOV. Each FOV and FOV overlap may be the result of uniquely sized/shaped/positioned apertures located in front of the receiver and emitter. For example, a circular FOV may be the result of a circular-shaped aperture and a star-shaped FOV may be the result of a star-shaped aperture. Various permutations of these sizes/shapes/positions for each FOV may be possible.

FOVs A includes two partially overlapping rectangles. FOVs B includes two partially overlapping rectangles each having a sawtooth border. FOVs C includes two partially overlapping curved four-pointed stars. FOVs D includes two partially overlapping triangles. FOVs E includes two partially overlapping four-pointed stars. FOVs F includes two partially overlapping curved spikes. FOVs G includes two partially overlapping vertical ovals. FOVs H includes two partially overlapping half-circles. FOVs I includes two partially overlapping tear drops. FOVs J includes two partially overlapping curved double spikes. FOVs K includes two partially overlapping curved five-pointed stars. FOVs L includes two partially overlapping curved five-pointed stars.

FOVs M includes partially overlapping curved spike and small circle. FOVs N includes partially overlapping circle and triangle. FOVs 0 includes partially overlapping four-pointed star and vertical oval. FOVs P includes partially overlapping vertical oval and horizontal oval. FOVs Q includes partially overlapping dual half-circles and dual spikes. FOVs R includes partially overlapping dual vertical ovals and dual triangles. FOVs S includes partially overlapping hexagon and horizontal oval. FOVs T includes partially overlapping large half-circle and small spike. FOVs U includes partially overlapping and horizontally offset half-spikes. FOVs V includes partially overlapping and horizontally offset four-pointed curved stars. FOVs W includes partially overlapping and horizontally offset three-pointed curved stars. FOVs X includes partially overlapping and horizontally offset angled half-circle and curved double ended dagger shape. FOVs Y includes partially overlapping rectangle and fractional circle.

FIG. 7 depicts a block-diagram of an exemplary adjustable aperture system. An adjustable aperture system 700 includes a TX/RX module 705. The TX/RX module includes a transmitter 710 (TX) and receiver 715 (RX). The TX/RX module includes an aperture assembly 720 and actuators 725 controlled by a controller 730. The controller may send command signals to the actuators which controls various aperture sizes/shapes/positions of the aperture assembly. The TX/RX module includes an I/O 735 operatively coupled with the controller.

An adjustable aperture system 700 includes an aperture control system 740. The aperture control system includes a CPU 745, RAM 750, NVM 755 (storing programs P1 and P2, for example) and I/O 760. The aperture control system may interface with the TX/RX module to send command signals to the controller via the I/Os.

An adjustable aperture system 700 includes an environmental detection system 765. The environmental detection system 765 includes CPU 770, RAM 775, NVM 780, and I/O 785. The environmental detection system includes at least one (environmental) sensor 790. An environmental sensor may be, for example, a wind speed sensor, a sunlight sensor, a humidity sensor, or a fog sensor. The sensors may detect various environmental parameters associated with the TX/RX module, and may send environmental data to the aperture control system via the I/Os. The aperture control system may then process the environmental data and send control signals to the TX/RX module to set various aperture parameters.

For example, on a calm and cloudy day, the optimal placing for apertures at the transmitter/receiver may be to align the apertures with the respective optical axes of the transmitter/receiver. On a windy and sunny day however, the optimal placing for apertures at the transmitter/receiver may be to offset the apertures with the respective optical axes of the transmitter/receiver. Accordingly, the adjustable aperture system 700 may advantageously allow for on-the-fly optimization of the apertures of a photoelectric sensor system to provide better object detecting performance in a given set of environmental conditions.

FIGS. 8A, 8B, and 8C depict exemplary optical beam distributions for a nominal transmitter/receiver FOV 800A, an aligned-modified transmitter/receiver FOV 800B, and an offset-modified transmitter/receiver FOV 800C, respectively. An optical beam distribution may be an optical beam distribution of a transmitter or a receiver. For example, a transmitter optical beam distribution may describe the intensity of light emitted at different angles ($\theta$) relative to the transmitter's optical axis, where the transmitter's optical axis may define a maximum intensity of the light being emitted from the transmitter. A receiver optical beam distribution may describe a sensor sensitivity to light incident at different angles ($\theta$) relative to the receiver's optical axis, where the receiver's optical axis may define a maximum sensitivity to light incident along the receiver's optical axis. In these exemplary embodiments, the optical beam distribution has the form of a Gaussian curve.

In various examples, a nominal transmitter or nominal receiver FOV 800A (see, e.g., FIG. 8A) may be defined as the full width at half maximum (FWHM) of a "natural" or "unmodified" transmitter/receiver optical beam distribution. A modified transmitter or modified receiver FOV 800B or 800C (see, e.g., FIGS. 8B and 8C) may be defined as the full width at half maximum (FWHM) of an aperture-modified transmitter/receiver optical beam distribution. For example, a modified FOV may be defined by a nominal FOV that is modified by an aperture to limit or substantially eliminate light rays exiting/entering from certain angles of the optical beam distribution.

In the depicted example of FIG. 8B, a nominal transmitter/receiver FOV 800A has been modified by an aperture aligned with an optical axis of the transmitter/receiver. This modification by the aperture compresses the optical beam distribution from a wider (nominal) distribution in FIG. 8A to a narrower (modified) distribution 800B in FIG. 8B, thus resulting in a smaller transmitter/receiver FOV in FIG. 8B versus FIG. 8A. In the depicted example of FIG. 8C, the optical beam distribution 800C has been modified by an aperture that is offset from an optical axis of a transmitter/receiver. As such, the peak of the modified offset distribution is offset from the optical axis of a transmitter receiver. Accordingly, the optical distribution of FIG. 8C has an offset/shifted/narrower FOV, versus the nominal FOV of FIG. 8A.

FIG. 9 depicts a perspective exploded view of an exemplary photoelectric sensor apparatus having an aperture plate and baffle with alignment pins. A retroreflective sensor apparatus 900 includes transmitter/emitter 905 and a photodetector/receiver 910. The apparatus 900 includes a printed circuit board 915 (PCB) that is operably coupled to the transmitter 905 and receiver 910 (e.g., the transmitter and receiver may be mounted on the PCB such that the transmitter and receiver are electrically and operably coupled to the electronic components/circuitry of the PCB). The apparatus 900 further includes an aperture plate 920, a baffle 925, and a bifurcated lens 930. In this exemplary depiction, the baffle 925 includes two alignment pins 925a, 925b, that are configured to align the components of the apparatus 900 together.

For example, a (metal) first alignment pin 925a of the baffle 925 may pass through respective holes of the PCB 915, the aperture plate 920, and the lens 930 for highly controlled alignment. Specifically, the PCB 915 may have a first PCB alignment hole 915a, the aperture plate 920 may have a first plate alignment hole 920a, and the lens 930 may have a first lens alignment hole 930a, where all the holes 915a, 920a, and 930a are configured to receive the first alignment pin 925a to properly align the components of the apparatus 900. In some examples a second alignment pin 925b may be included with the baffle 925. The second alignment pin may be configured to pass through respective holes/slots of the PCB 915, aperture plate 920, and the lens 930, for example. Specifically, the PCB 915 may have a second PCB alignment hole 915b, the aperture plate 920 may have a plate alignment slot 920b, and the lens 930 may have a lens alignment slot 930b, where all the holes/slots 915b, 920b, and 930b are configured to receive the second alignment pin 925b to properly align the components of the apparatus 900. In various implementations, the first pin 925a may cooperate with the second pin 925b to advantageously prevent the various components of the apparatus 900 from rotating relative to each other (when the apparatus 900 is fully assembled).

In various embodiments, the bifurcated lens 930 may be precision made to control the vertex spacing between two lens elements 930c, 930d. The aperture plate 920 may contain emitter and receiver apertures 920c, 920d. The baffle 925 may include baffle apertures 925c, 925d. The lens element 930c, baffle aperture 925c, aperture plate aperture 920c, and optical axis of the emitter 905 may all be configured to at least partially align with one another when the apparatus 900 is fully assembled, while the lens element 930d, baffle aperture 925d, aperture plate aperture 920d, and optical axis of the emitter 910 may all be configured to at least partially align with one another when the apparatus 900 is fully assembled. By swapping out only the aperture plate 925 (e.g., for another, different aperture plate), the system's FOV and maximum range can easily be customized and adjusted on-the-fly and in the field.

FIG. 10 depicts a side cross-sectional view of an exemplary photoelectric sensor apparatus having an aperture plate and baffle with alignment pins. A photoelectric sensor apparatus 1000 (which may be substantially similar, in at least some aspects, to the apparatus 900) includes an emitter 1005 and a receiver 1010 operably mounted to a PCB 1015. The PCB 1015 may be operably coupled to other electronic components (e.g., via wires, to provide data and/or power connections, for example). Located in front of the emitter 1005 and the receiver 1010 are an emitter aperture 1020a and a receiver aperture 1020b, respectively. In various examples, the apertures 1020a and 1020b are included with an aperture plate (e.g., plate 920). The apparatus 1000 includes a baffle 1025 and a pair of lenses 1030. The lenses 1030, baffle 1025, and apertures 1020a, 1020b may all cooperate to control the FOV of the emitter 1005 and receiver 1010, which may advantageously allow for setting of the FOV overlap, maximum sensor range, and white card signal thresholds for the apparatus 1000.

Figure 11:
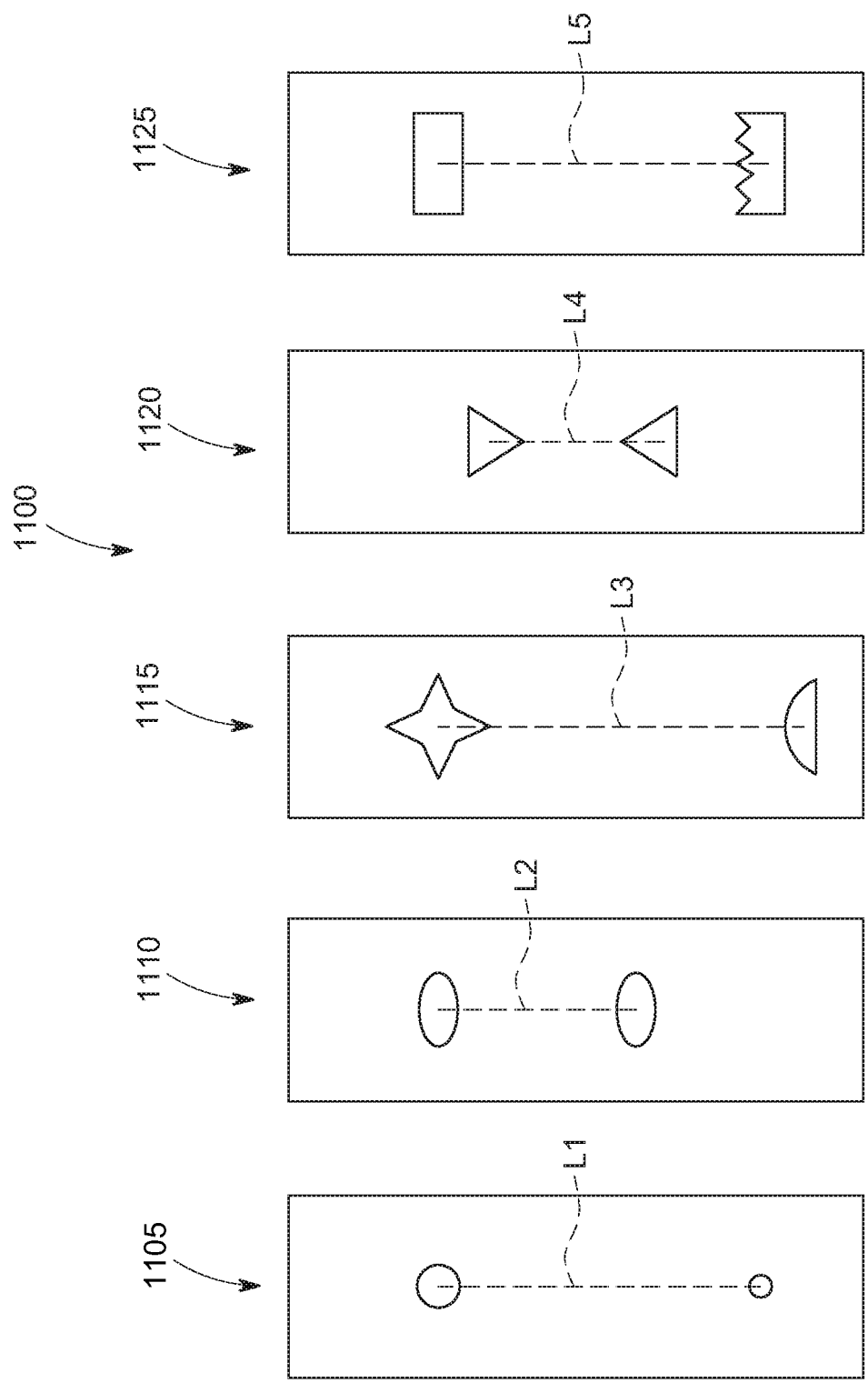
FIG. 11 depicts front views of exemplary aperture plates, which may be included in a photoelectric sensor kit.

FIG. 11 depicts front views of exemplary aperture plates, which may be included in a photoelectric sensor kit. An exemplary set of aperture plates 1100 may be included with a kit that allows a user to customize an FOV overlap, maximum sensor range, and white card signal thresholds for a photoelectric sensor apparatus. For example, a kit may include multiple aperture plates 1100, along with other elements of a photoelectric sensor apparatus (e.g., baffle, lenses, transmitter, receiver, PCB). A user may custom-tailor an apparatus for a specific application, setting, or environmental conditions, by selectively swapping out aperture plates 1100 for one another. Although a limited number of exemplary aperture plates are shown, variations on aperture plates may create an almost unlimited number of permutations of plates (e.g., each plate having different sized/shaped apertures, with varying distances between the two apertures)

For example, a first plate 1105 may include two apertures spaced length $L_1$ apart from one another, where both apertures are circular shaped, with one having a larger diameter compared to the other. A second plate 1110 may include two oval-shaped apertures spaced length $L_2$ apart from one another. A third aperture plate may include a star-shaped aperture and a fractional circle aperture spaced length $L_3$ apart from one another. A fourth plate 1120 may include two triangle-shaped apertures spaced length $L_4$ apart from one another. A fifth aperture plate 1125 may include a rectangular shaped aperture and another aperture with sawtooth perimeter, that are spaced length $L_5$ apart from one another. In some examples, the distances $L_1$-$L_5$ may all be different from one another. The distances $L_1$-$L_5$ may be based on the distances between the centroids (or geometric centers) of each aperture. Accordingly, a kit may include multiple aperture plates, where each plate is swappable with another plate in the photoelectric sensor apparatus to selectively control FOVs of a photoelectric sensor system, advantageously allowing for in-the-field customization of max sensor range and white card signal thresholds for a photoelectric sensor system.

Although various embodiments have been described with reference to the Figures, other embodiments are possible. For example, an aperture associated with a transmitter or receiver may be offset (e.g., vertically and/or horizontally) from the optical axis of the transmitter or receiver. Some embodiments may be adapted to operate at substantially long ranges (e.g., on the order of 30 ft. or more). A photoelectric sensor system may advantageously address the "white card" issue, while also providing reliable information of a retro signal reflected back toward the receiver in environments (e.g., smoke, humidity) that may diminish the optical signal generated by the transmitter.

An aperture module may, in some examples, adjust a field of view (FOV) of a receiver. For example, an aperture slightly offset from the optical axis of the receiver may tilt the receiver FOV up slightly to minimize the amount of overlap with a transmitter FOV, such that problems with white card effect are decreased/minimized. An aperture module may, in some examples, adjust a field of view (FOV) of a transmitter. An aperture module may, in some examples, adjust a field of view (FOV) of both a transmitter and receiver. Apertures may or may not be offset from an optical axis. For example, a receiver aperture may be aligned with an optical axis of the receiver, while a transmitter aperture may be offset from alignment with an optical axis of the transmitter. In some embodiments, a receiver aperture may be slightly off the optical axis of a receiver.

Some examples may minimize the area of overlap between the receiver and transmitter FOVs, while still providing for a non-zero overlap between the FOVs. Reducing the FOV overlap may reduce the "white card" signal, which may allow for a predetermined light intensity threshold level to be reduced, which, in turn, may increase the range on a photoelectric sensor system. In some embodiments, adjusting FOVs and their overlap may be accomplished by using different sized/positioned/shaped apertures. For example, a receiver aperture may be larger than a transmitter aperture. An aperture may be positioned slightly differently (e.g., aligned or vertically/horizontally offset from an optical axis).

In various embodiments, an unmodified overlap between a nominal transmitter FOV and a nominal receiver FOV may be made into a modified smaller overlap that reduces the amount of energy received by the receiver (e.g., light intensity concentrated in a smaller region). A modified smaller FOV overlap may allow for lower object detection thresholds to be set for the receiver, which may advantageously allow for extended range for a photoelectric sensor system. A modified smaller FOV overlap may decrease the amount of scattered light from a white card that reaches the receiver. A modified smaller overlap may advantageously be more resistant to the "white card effect" while increasing the maximum range of a photoelectric sensor system. Addition of an aperture module may advantageously change a photoelectric sensor system from a short to a long-range application.

In some embodiments, a modified larger FOV overlap may advantageously result in a more rugged sensor system that may be more resistant to sensor or target motion by maintaining alignment while the transmitter/receiver module is experiencing horizontal force disturbances (e.g., due to high winds). For example, a modified FOV overlap with a narrower vertical overlap and larger horizontal overlap may advantageously mitigate the "white card effect" while being highly resistant to horizontal sensor or target motion.

A housing may, for example, be used in some embodiments to house various components of the transmitter/receiver module. For example, the transmitter/receiver module 205, 405 may include a housing that houses the transmitter, receiver, aperture module/plate(s), lens(es), and/or masks. The housing may, in some embodiments, include an aperture plate slot or slots (e.g., slot 435, slots 435A, 435B) configured to receive an aperture plate or aperture plates.

In some embodiments, the transmitter may emit a specific frequency (or frequencies) of light. For example, a transmitter may emit light at frequencies in the visible spectrum (e.g., red, green, blue, white). A transmitter may, for example, emit light at frequencies below the visible spectrum (e.g., short or long wavelength IR). A transmitter may, for example, emit light at frequencies above the visible spectrum (e.g., ultraviolet). In various embodiments, the receiver (e.g., photodetector) may be sensitive to a specific frequency (or frequencies) of light. For example, a receiver may be sensitive to IR light, but not to visible light. A receiver may, for example, be sensitive to red light, but not any other frequency of light. A receiver may, for example, be sensitive to visible light and UV light, but not IR light.

In various examples, slight changes to the distance between apertures and/or the size of the apertures may significantly increase performance of a photoelectric sensor system. For example, adjusting the distance between a transmitter and receiver aperture by a few microns may have a significant impact on the degree of FOV overlap. Adjusting the size and shape of the transmitter and receiver apertures by a few microns may have a significant impact on the degree of (horizontal/vertical) FOV overlap. In some examples, "modifying" a (nominal) FOV may include changing the shape, size, and/or position of the FOV by using specifically shaped, sized, and/or positioned apertures.

In various examples, a photoelectric sensor system may be configured to detect objects in a field between a light source and a retro-reflecting target. The photoelectric sensor system may include an emitter having an emitter optical axis and a nominal emitter field of view (FOV), the emitter being configured to generate an optical signal directed along an incident optical path from the emitter to a retro-reflective substrate operable to redirect a portion of light from the incident optical path to a reflected optical path. The photoelectric sensor system may include a photodetector mounted adjacent to and offset from the emitter, the photodetector having a photodetector optical axis and a nominal photodetector FOV, the photodetector being configured to receive at least a portion of the generated optical signal reflected by the retro-reflective substrate along the reflected optical path. The photoelectric sensor system may include an aperture module having at least one aperture configured to modify the at least one of the nominal FOVs to form a modified FOV.

In some examples, the photoelectric sensor system may include a collimating lens positioned in front of the emitter, the collimating lens configured to collimate the generated optical signal along the incident optical path toward the retro-reflective substrate. The photoelectric sensor system may include a condensing lens positioned in front of the photodetector, the condensing lens configured to converge the generated optical signal from the reflected optical path towards the photodetector. The photoelectric sensor system may include a controller operably coupled to the photodetector and configured to generate a notification signal in response to determining that the incident optical path is obstructed between the emitter and the retroreflective substrate based on the detected first and second light patterns.

In some examples, the modified FOV may include a modified emitter FOV. The modified FOV may include a modified photodetector FOV. The at least one aperture may include a first aperture configured to modify the nominal emitter FOV, and a second aperture configured to modify the nominal photodetector FOV. In various embodiments, the first aperture may be aligned with the emitter optical axis. The first aperture may be offset from the emitter optical axis. The second aperture may be aligned with the photodetector optical axis. The second aperture may be offset from the photodetector optical axis.

Some embodiments may include a baffle having a registration pin configured to properly align the aperture module with the emitter and photodetector. The photoelectric sensor system may include, for example, a printed circuit board (PCB) and a lens module, where the emitter and photodetector are mounted to the PCB, and the lens module includes the collimating lens and the condensing lens. In various examples, the registration pin may be configured to couple and properly align the PCB, the aperture module, the baffle, and the lens module with one another. The registration pin may, for example, be configured to be inserted into a PCB hole, an aperture module hole, and a lens module hole to couple and properly align the PCB, the aperture module, the baffle, and the lens module with one another. In some examples, the baffle may include an injection molded part. In various embodiments, the registration pin may include a steel pin.

A photoelectric sensor system may be configured to detect objects in a field between a light source and a retro-reflecting target. The system may include an emitter having an emitter optical axis and a nominal emitter field of view (FOV), the emitter being configured to generate an optical signal directed along an incident optical path from the emitter to a retro-reflective substrate operable to redirect a portion of light from the incident optical path to a reflected optical path. The system may include a photodetector mounted adjacent to and offset from the emitter, the photodetector having a photodetector optical axis and a nominal photodetector FOV, the photodetector being configured to receive at least a portion of the generated optical signal reflected by the retro-reflective substrate along the reflected optical path. The system may include a modular, unitary-construction aperture plate, for example. The aperture plate may include, in some implementations, an emitter aperture configured to alter the nominal emitter FOV to a modified emitter FOV. The aperture plate may include, in some implementations, a photodetector aperture configured to alter the nominal photodetector FOV to a modified photodetector FOV. The photodetector aperture may be located a predetermined distance from the emitter aperture. The system may include a frame (e.g. baffles 525, 925, 1025) configured to support the aperture plate in a fixed position relative to the emitter and photodetector. In some examples, at least one of the emitter aperture and photodetector aperture may be misaligned with, and offset from, an emitter optical axis and a photodetector optical axis, respectively, when the aperture plate is operably coupled with the frame. At least one of the emitter aperture and the photodetector aperture may be non-circularly shaped apertures (e.g., oval-shaped or cross-shaped), in some implementations. Various structures for removably coupling the aperture plate with the frame may include a pin 525A/525B/925a/925b and an aperture plate pin-mating feature 520A/520B/920a/920b. Various structures for removably coupling the aperture plate with the frame may include an aperture plate locking clip 425A/425B and a frame locking clip-mating feature 435A/435B. Various structures for removably coupling the aperture plate with the frame may include an aperture plate magnet 445A/445B/450A/450B fixedly coupled with the aperture plate, and a frame magnet 455A/455B/460A/460B fixedly coupled with the frame.

In some examples, a photoelectric sensor system may include a printed circuit board (PCB). The emitter and photodetector may be fixedly and operably coupled to the PCB, in various examples. A photoelectric sensor system may include a bifurcated lens. The bifurcated lens may include an emitter lens configured to at least partially align with the emitter, and a photodetector lens configured to at least partially align with the photodetector, in at least some implementations. In various examples, the PCB may include a PCB pin-mating feature configured to mate with the frame pin. In some embodiments, the bifurcated lens may include a lens pin-mating feature configured to mate with the frame pin. In various implementations, when the PCB, the aperture plate, the frame, and the lens member are all mechanically coupled together via the frame pin, the PCB, aperture plate, and bifurcated lens are removably supported by the frame via the frame pin. In some examples, the emitter and photodetector apertures may be ellipse-shaped, with each of the emitter and photodetector apertures having a respective major axis oriented horizontally, and a respective minor axis oriented vertically, such that an FOV overlap between the modified emitter FOV and the modified photodetector FOV is a vertical overlap along the respective minor axes of the emitter and photodetector apertures.

In some examples, a first aperture plate, may include a first emitter aperture and a first photodetector aperture, and a second modular, unitary-construction aperture plate may include a second emitter aperture configured to alter the nominal emitter FOV to a second modified emitter FOV, and a second photodetector aperture configured to alter the nominal photodetector FOV to a second modified photodetector FOV, and disposed a predetermined distance from the second emitter aperture. In various implementations, at least one of a (1) shape, (2) size, and (3) position on the second aperture plate, of at least one of the second emitter aperture and second photodetector aperture, is different from a (4) shape, (5) size, and (6) position on the first aperture plate, of at least one of the first emitter aperture and first photodetector aperture, respectively. In some examples, a first modified FOV overlap associated with the first modified emitter FOV and the first modified photodetector FOV is different from a second modified FOV overlap associated with the second modified emitter FOV and the first modified photodetector FOV. Some embodiments of a photoelectric sensor system may be configured such that the first aperture plate is swappable with the second aperture plate, such that swapping out aperture plates permits a user to selectively set a FOV overlap and maximum range of the photoelectric sensor system.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., modify beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A photoelectric sensor system configured to detect objects in a field between a light source and a retro-reflecting target, the system comprising:
   an emitter having an emitter optical axis and a nominal emitter field of view (FOV), the emitter being configured to generate an optical signal directed along an incident optical path from the emitter to a retro-reflective substrate operable to redirect a portion of light from the incident optical path to a reflected optical path;
   a photodetector mounted adjacent to and offset from the emitter, the photodetector having a photodetector optical axis and a nominal photodetector FOV, the photodetector being configured to receive at least a portion of the generated optical signal reflected by the retro-reflective substrate along the reflected optical path;
   a modular, unitary-construction aperture plate comprising:
      an emitter aperture configured to alter the nominal emitter FOV to a modified emitter FOV; and,
      a photodetector aperture configured to alter the nominal photodetector FOV to a modified photodetector FOV, and disposed a predetermined distance from the emitter aperture;
   a frame configured to support the aperture plate in a fixed position relative to the emitter and photodetector, wherein at least one of the emitter aperture and photodetector aperture are misaligned with, and offset from, an emitter optical axis and a photodetector optical axis, respectively, when the aperture plate is operably coupled with the frame; and,
   means for removably coupling the aperture plate with the frame.

2. The photoelectric sensor system of claim 1, wherein the means for removably coupling the aperture plate with the frame comprises a frame pin and an aperture plate pin-mating feature.

3. The photoelectric sensor system of claim 1, wherein the means for removably coupling the aperture plate with the frame comprises an aperture plate locking clip and a frame locking clip-mating feature.

4. The photoelectric sensor system of claim 1, wherein the means for removably coupling the aperture plate with the frame comprises an aperture plate magnet fixedly coupled with the aperture plate and a frame magnet fixedly coupled with the frame.

5. The photoelectric sensor system of claim 2, further comprising a printed circuit board (PCB), wherein the emitter and photodetector are fixedly and operably coupled to the PCB.

6. The photoelectric sensor system of claim 5, further comprising a bifurcated lens comprising:
   an emitter lens configured to at least partially align with the emitter, and
   a photodetector lens configured to at least partially align with the photodetector.

7. The photoelectric sensor system of claim 6, wherein:
   the PCB comprises a PCB pin-mating feature configured to mate with the frame pin, and
   the bifurcated lens comprises a lens pin-mating feature configured to mate with the frame pin,
   such that when the PCB, the aperture plate, the frame, and the bifurcated lens are all mechanically coupled together via the frame pin, the PCB, aperture plate, and bifurcated lens are removably supported by the frame via the frame pin.

8. The photoelectric sensor system of claim 1, wherein the emitter and photodetector apertures are ellipse-shaped, each of the emitter and photodetector apertures having a respective major axis oriented horizontally, and a respective minor axis oriented vertically, such that an FOV overlap between the modified emitter FOV and the modified photodetector FOV is a vertical overlap along the respective minor axes of the emitter and photodetector apertures.

9. The photoelectric sensor system of claim 1, wherein the aperture plate is a first aperture plate, the emitter aperture is a first emitter aperture, and the photodetector aperture is a first photodetector aperture, wherein the photoelectric sensor system further comprises:
   a second modular, unitary-construction aperture plate comprising:
      a second emitter aperture configured to alter the nominal emitter FOV to a second modified emitter FOV; and,
      a second photodetector aperture configured to alter the nominal photodetector FOV to a second modified photodetector FOV, and disposed a predetermined distance from the second emitter aperture,
   wherein at least one of a (1) shape, (2) size, and (3) position on the second aperture plate, of at least one of the second emitter aperture and second photodetector aperture, is different from a (4) shape, (5) size, and (6) position on the first aperture plate, of at least one of the first emitter aperture and first photodetector aperture, respectively, such that a first modified FOV overlap associated with the first modified emitter FOV and the first modified photodetector FOV is different from a second modified FOV overlap associated with the second modified emitter FOV and the second modified photodetector FOV.

10. The photoelectric sensor system of claim 9, wherein the first aperture plate is swappable with the second aperture plate in the photoelectric sensor system, such that swapping out aperture plates permits a user to selectively set a FOV overlap and maximum range of the photoelectric sensor system.

11. A photoelectric sensor system configured to detect objects in a field between a light source and a retro-reflecting target, the system comprising:
   an emitter having an emitter optical axis and a nominal emitter field of view (FOV), the emitter being configured to generate an optical signal directed along an incident optical path from the emitter to a retro-reflective substrate operable to redirect a portion of light from the incident optical path to a reflected optical path;
   a photodetector mounted adjacent to and offset from the emitter, the photodetector having a photodetector optical axis and a nominal photodetector FOV, the photodetector being configured to receive at least a portion of the generated optical signal reflected by the retro-reflective substrate along the reflected optical path;
   a modular, unitary-construction aperture plate comprising:
      an emitter aperture configured to alter the nominal emitter FOV to a modified emitter FOV; and,
      a photodetector aperture configured to alter the nominal photodetector FOV to a modified photodetector FOV, and disposed a predetermined distance from the emitter aperture;
   a frame configured to support the aperture plate in a fixed position relative to the emitter and photodetector; and,
   means for removably coupling the aperture plate with the frame.

12. The photoelectric sensor system of claim 11, wherein the means for removably coupling the aperture plate with the frame comprises a frame pin and an aperture plate pin-mating feature.

13. The photoelectric sensor system of claim 12, further comprising a printed circuit board (PCB), wherein the emitter and photodetector are fixedly and operably coupled to the PCB.

14. The photoelectric sensor system of claim 13, further comprising a bifurcated lens comprising:
   an emitter lens configured to at least partially align with the emitter, and
   a photodetector lens configured to at least partially align with the photodetector.

15. The photoelectric sensor system of claim 14, wherein:
   the PCB comprises a PCB pin-mating feature configured to mate with the frame pin, and
   the bifurcated lens comprises a lens pin-mating feature configured to mate with the frame pin,
   such that when the PCB, the aperture plate, the frame, and the bifurcated lens are all mechanically coupled together via the frame pin, the PCB, aperture plate, and bifurcated lens are removably supported by the frame via the frame pin.

16. The photoelectric sensor system of claim 11, wherein the aperture plate is a first aperture plate, the emitter aperture is a first emitter aperture, and the photodetector aperture is a first photodetector aperture, wherein the photoelectric sensor system further comprises:
   a second modular, unitary-construction aperture plate comprising:

a second emitter aperture configured to alter the nominal emitter FOV to a second modified emitter FOV; and, a second photodetector aperture configured to alter the nominal photodetector FOV to a second modified photodetector FOV, and disposed a predetermined distance from the second emitter aperture, wherein at least one of a (1) shape, (2) size, and (3) position on the second aperture plate, of at least one of the second emitter aperture and second photodetector aperture, is different from a (4) shape, (5) size, and (6) position on the first aperture plate, of at least one of the first emitter aperture and first photodetector aperture, respectively, such that a first modified FOV overlap associated with the first modified emitter FOV and the first modified photodetector FOV is different from a second modified FOV overlap associated with the second modified emitter FOV and the second modified photodetector FOV.

17. The photoelectric sensor system of claim 16, wherein the first aperture plate is swappable with the second aperture plate in the photoelectric sensor system, such that swapping out aperture plates permits a user to selectively set a FOV overlap and maximum range of the photoelectric sensor system.

18. A photoelectric sensor system configured to detect objects in a field between a light source and a retro-reflecting target, the system comprising:

an emitter having an emitter optical axis and a nominal emitter field of view (FOV), the emitter being configured to generate an optical signal directed along an incident optical path from the emitter to a retro-reflective substrate operable to redirect a portion of light from the incident optical path to a reflected optical path;

a photodetector mounted adjacent to and offset from the emitter, the photodetector having a photodetector optical axis and a nominal photodetector FOV, the photodetector being configured to receive at least a portion of the generated optical signal reflected by the retro-reflective substrate along the reflected optical path;

a modular, unitary-construction aperture plate comprising:

an emitter aperture configured to alter the nominal emitter FOV to a modified emitter FOV; and, a photodetector aperture configured to alter the nominal photodetector FOV to a modified photodetector FOV, and disposed a predetermined distance from the emitter aperture, wherein at least one of the emitter aperture and the photodetector aperture are non-circularly shaped apertures;

a frame configured to support the aperture plate in a fixed position relative to the emitter and photodetector; and, means for removably coupling the aperture plate with the frame.

19. The photoelectric sensor system of claim 18, wherein the aperture plate is a first aperture plate, the emitter aperture is a first emitter aperture, and the photodetector aperture is a first photodetector aperture, wherein the photoelectric sensor system further comprises:

a second modular, unitary-construction aperture plate comprising:

a second emitter aperture configured to alter the nominal emitter FOV to a second modified emitter FOV; and, a second photodetector aperture configured to alter the nominal photodetector FOV to a second modified photodetector FOV, and disposed a predetermined distance from the second emitter aperture, wherein at least one of a (1) shape, (2) size, and (3) position on the second aperture plate, of at least one of the second emitter aperture and second photodetector aperture, is different from a (4) shape, (5) size, and (6) position on the first aperture plate, of at least one of the first emitter aperture and first photodetector aperture, respectively, such that a first modified FOV overlap associated with the first modified emitter FOV and the first modified photodetector FOV is different from a second modified FOV overlap associated with the second modified emitter FOV and the second modified photodetector FOV.

20. The photoelectric sensor system of claim 19, wherein the first aperture plate is swappable with the second aperture plate in the photoelectric sensor system, such that swapping out aperture plates permits a user to selectively set a FOV overlap and maximum range of the photoelectric sensor system.

* * * * *